(12) United States Patent
Noon et al.

(10) Patent No.: US 12,278,844 B2
(45) Date of Patent: *Apr. 15, 2025

(54) PROTECTING CONTENTS AND ACCOUNTS USING SCAN OPERATION

(71) Applicant: Material Security Inc., San Jose, CA (US)

(72) Inventors: Ryan M. Noon, Mountain View, CA (US); Abhishek Agrawal, San Francisco, CA (US); Christopher J. Park, San Jose, CA (US)

(73) Assignee: Material Security Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,920

(22) Filed: Sep. 6, 2023

(65) Prior Publication Data

US 2023/0412648 A1 Dec. 21, 2023

Related U.S. Application Data

(63) Continuation of application No. 17/378,554, filed on Jul. 16, 2021, now Pat. No. 11,799,913, which is a (Continued)

(51) Int. Cl.
*H04L 9/40* (2022.01)
*G06F 21/31* (2013.01)
(Continued)

(52) U.S. Cl.
CPC .......... *H04L 63/20* (2013.01); *G06F 21/31* (2013.01); *G06F 21/604* (2013.01);
(Continued)

(58) Field of Classification Search
CPC ..... H04L 63/20; H04L 63/102; H04L 63/105; H04L 51/212; H04L 51/18; G06F 21/31;
(Continued)

(56) References Cited

U.S. PATENT DOCUMENTS 6,785,810 B1 *  8/2004  Lirov ................ H04L 9/083
                                              707/999.009
8,935,768 B1    1/2015  Tyree
(Continued)

OTHER PUBLICATIONS

Extended European search report, European Patent Office Application No. EP18832232.5, Jun. 10, 2021, 12 pages.
(Continued)

*Primary Examiner* — Henry Tsang
(74) *Attorney, Agent, or Firm* — Fenwick & West LLP

(57) ABSTRACT

An example method comprises receiving, by a secure content system, an email from a sender to a recipient, scanning the contents of the email, evaluating the contents of the email based on a plurality of security rules, storing the sensitive data within a secure storage, generating a replacement email including a security link and not including at least the sensitive data, the security link providing a requester access to the sensitive data providing that a security function is satisfied, sending the replacement email including the security link to the recipient, receiving a request to access the sensitive data, the request being related to the security function challenging the requester using the security function, receiving, from the requester, a response to the security function, determining if the security function is satisfied by the response, and if the security function is satisfied, providing access to the sensitive data to the requester.

20 Claims, 13 Drawing Sheets

Related U.S. Application Data continuation of application No. 16/034,199, filed on Jul. 12, 2018, now Pat. No. 11,102,247.

(60) Provisional application No. 62/531,471, filed on Jul. 12, 2017, provisional application No. 62/568,742, filed on Oct. 5, 2017.

(51) Int. Cl.
*G06F 21/60* (2013.01)
*G06F 21/62* (2013.01)
*G06Q 10/107* (2023.01)

(52) U.S. Cl.
CPC ........ *G06F 21/606* (2013.01); *G06F 21/6245* (2013.01); *H04L 63/102* (2013.01); *H04L 63/105* (2013.01); *G06Q 10/107* (2013.01)

(58) Field of Classification Search
CPC .. G06F 21/604; G06F 21/606; G06F 21/6245; G06Q 10/107
See application file for complete search history.

(56) References Cited

U.S. PATENT DOCUMENTS

| | | | | |
|---|---|---|---|---|
| 9,268,958 | B1* | 2/2016 | Kessler | G06F 21/6209 |
| 2005/0138353 | A1 | 6/2005 | Spies et al. | |
| 2006/0075228 | A1* | 4/2006 | Black | H04L 63/104 |
| | | | | 713/167 |
| 2012/0240238 | A1* | 9/2012 | Gates | H04N 21/41407 |
| | | | | 726/26 |
| 2014/0366158 | A1* | 12/2014 | Han | G06F 21/32 |
| | | | | 726/28 |
| 2015/0082391 | A1* | 3/2015 | Lerman | H04L 63/08 |
| | | | | 726/4 |
| 2016/0210602 | A1 | 7/2016 | Siddique et al. | |
| 2016/0352695 | A1 | 12/2016 | Kozolchyk et al. | |
| 2017/0111325 | A1 | 4/2017 | Maller et al. | |
| 2017/0256008 | A1 | 9/2017 | Hara | |
| 2017/0331777 | A1* | 11/2017 | Brisebois | H04L 51/212 |

OTHER PUBLICATIONS

International Search Report and Written Opinion, Patent Cooperation treaty Application No. PCT/US2018/041897, Nov. 20, 2018, 10 pages.

Partial supplementary European search report, European Patent Office Application No. EP18832232.5, Mar. 9, 2021, 13 pages.

United States Office Action, U.S. Appl. No. 16/034,199, filed Dec. 11, 2020, 11 pages.

United States Office Action, U.S. Appl. No. 16/034,199, filed Sep. 8, 2020, 10 pages.

United States Office Action, U.S. Appl. No. 17/378,554, filed Jan. 11, 2023, 11 pages.

United States Office Action, U.S. Appl. No. 17/378,554, filed Sep. 22, 2022, 13 pages.

\* cited by examiner

ND ACCOUNTS
PROTECTING CONTENTS AND ACCOUNTS USING SCAN OPERATION

CROSS REFERENCE TO RELATED APPLICATIONS

The present application is a continuation of U.S. patent application Ser. No. 17/378,554, filed Jul. 16, 2021 which is a continuation of U.S. patent application Ser. No. 16/034,199, filed Jul. 12, 2018 (now U.S. Pat. No. 11,102,247) which claims benefit of U.S. Provisional Patent Application No. 62/531,471, filed Jul. 12, 2017, and entitled "Systems and Methods for Protecting Electronic Accounts and Content" and U.S. Provisional Patent Application No. 62/568,742, filed Oct. 5, 2017, and entitled "Systems and Methods for Protecting Electronic Accounts and Content," which are incorporated by reference herein.

FIELD OF THE INVENTION

Embodiments of the present invention related generally to protecting contents and accounts.

BACKGROUND

Current security systems are generally directed to blocking unauthorized users from accessing accounts. For example, there are numerous systems designed to challenge an attacker to block the attacker from logging into systems. Similarly, there are numerous anti-virus systems that scan email and files to find worms, viruses, or other forms of malware that may attack a system to either damage the system or to enable unauthorized users access.

SUMMARY

A method comprising receiving, by a secure content system, an email from a sender to a recipient, scanning, by the secure content system, the contents of the email, evaluating, by the secure content system, the contents of the email based on a plurality of security rules, each of the plurality of security rules identifying sensitive data within the contents of the email, generating, by the secure content system, a replacement email including a security link and not including at least the sensitive data, the security link providing a requester access to the sensitive data providing that a security function is satisfied, sending, by the secure content system, the replacement email including the security link to the recipient, receiving, from a requester interacting with the security link, a request to access the sensitive data, the request being related to the security link, determining if the security function is satisfied by the response and if the security function is satisfied, enabling access, by the secure content system, to the sensitive data to the requester.

In various embodiments, the contents of the email includes textual components. In some embodiments, the one of the plurality of security rules includes text matching. In one embodiment, the method further comprising receiving, from the requester, the sensitive data after a predetermined loan period.

The method may further comprising after retrieving the sensitive from the secure location and providing the sensitive data to the request, deleting the sensitive data from the secure storage. In some embodiments, the email is sent from an enterprise system or the email is sent from a third-party email system.

The method may further comprising generating, by the secure content system, the plurality of security rules, each of the plurality of security rules associated with a criteria. In some embodiments, the method further comprising organizing each of the plurality of security rules into one of a plurality of security categories based on the criteria and wherein evaluating the contents of the email further comprises selecting one or more security categories based on the contents of the email, and scanning contents of the email to determine if one or more of the plurality of security rules associated with the selected one or more security categories are satisfied to identify sensitive data.

An example non-transitive computer readable medium comprising executable instructions, the executable instructions being executable by a processor for performing a method, the method comprising receiving, by a secure content system, an email from a sender to a recipient, scanning, by the secure content system, the contents of the email, evaluating, by the secure content system, the contents of the email based on a plurality of security rules, each of the plurality of security rules identifying sensitive data within the contents of the email, generating, by the secure content system, a replacement email including a security link and not including at least the sensitive data, the security link providing a requester access to the sensitive data providing that a security function is satisfied, sending, by the secure content system, the replacement email including the security link to the recipient, receiving, from a requester interacting with the security link, a request to access the sensitive data, the request being related to the security link, determining if the security function is satisfied by the response, and if the security function is satisfied, enabling access, by the secure content system, to the sensitive data to the requester.

An example system may comprise one or more processors, and memory, the memory including instructions to configure the one or more processors to register, by a content delivery system, accounts for a plurality of users, authenticate, by the content delivery system, one or more of the plurality of users, receive a first request to store user generated content and first user generated content by a first user of the plurality of users, the first user generated content being associated with at least the first user, the first request to store user generated content including an uploading user identifier, one or more first categorical identifiers associated with the first user generated content, and a first domain identifier, associate the first user generated content with an account of the first user, the uploading user identifier, the one or more first categorical identifiers, and the first domain identifier, store, by the content delivery system, the first user generated content and associations, receive a second request to store user generated content and second user generated content by the first user, the second user generated content being associated with at least one first user, the second request to store user generated content including an uploading user identifier, one or more second categorical identifiers associated with the second user generated content, and a second domain identifier, associate the second user generated content with the account of the first user, the uploading user identifier, the one or more second categorical identifiers, and the second domain identifier, store, by the content delivery system, the second user generated content and associations, receive, from a searching user at a web site associated with a domain, a search request, the search request including a search criteria including at least a third domain identifier, the third domain identifier being associated with the domain, if the third domain identifier is associated with the first domain identifier, determine all or a portion of the first user generated content to provide to the searching user based on the search criteria, and provide all or the portion of the first user generated content to the searching user, and if the third domain identifier is associated with the second domain identifier, determine all or a portion of the second user generated content to provide to the searching user based on the search criteria, and provide all or the portion of the first user generated content to the searching user.

DETAILED DESCRIPTION

It is appreciated that a person or entity that obtains access to email, document, or files may still be unauthorized to receive the contents of the email, document, or files. In some examples, a malicious user may bypass security and log into a target system to obtain access to a document or intercept an email from a targeted user or system (e.g., through redirection of email or spoofing). In yet another example, an employee may obtain email or documents from another part of their company even though they are not authorized to read or otherwise access the contents.

In at least some systems and methods described herein, a secure content system may intercept, receive, and/or scan email, document, and/or files. The system may identify information contained within the email, document, or files based on any number of rules (e.g., scanning for sensitive information based on sensitive data rules). The system may replace all or some of the information of the email, document, or files with any number of secure links. A user may obtain access to the email, document, or files, but otherwise may be unable to view the replaced information unless they engage the secure link. When the user interacts with the secure link, they may receive a challenge and/or security functions may be engaged to assist in determining if the user is authorized to receive the replaced content (i.e., the sensitive information that was replaced). If the challenge and/or security functions are satisfied, a secure content system may enable the recipient to access to the replaced information.

It will be appreciated that the system may include additional security functions. In some embodiments, the secure content system may limit access to the replaced information to a limited time duration, to a particular domain, to particular users/devices (e.g., MAC addresses), to particular network(s), to one or more particular users (e.g., users of a particular group), and/or the like.

Figure 1:
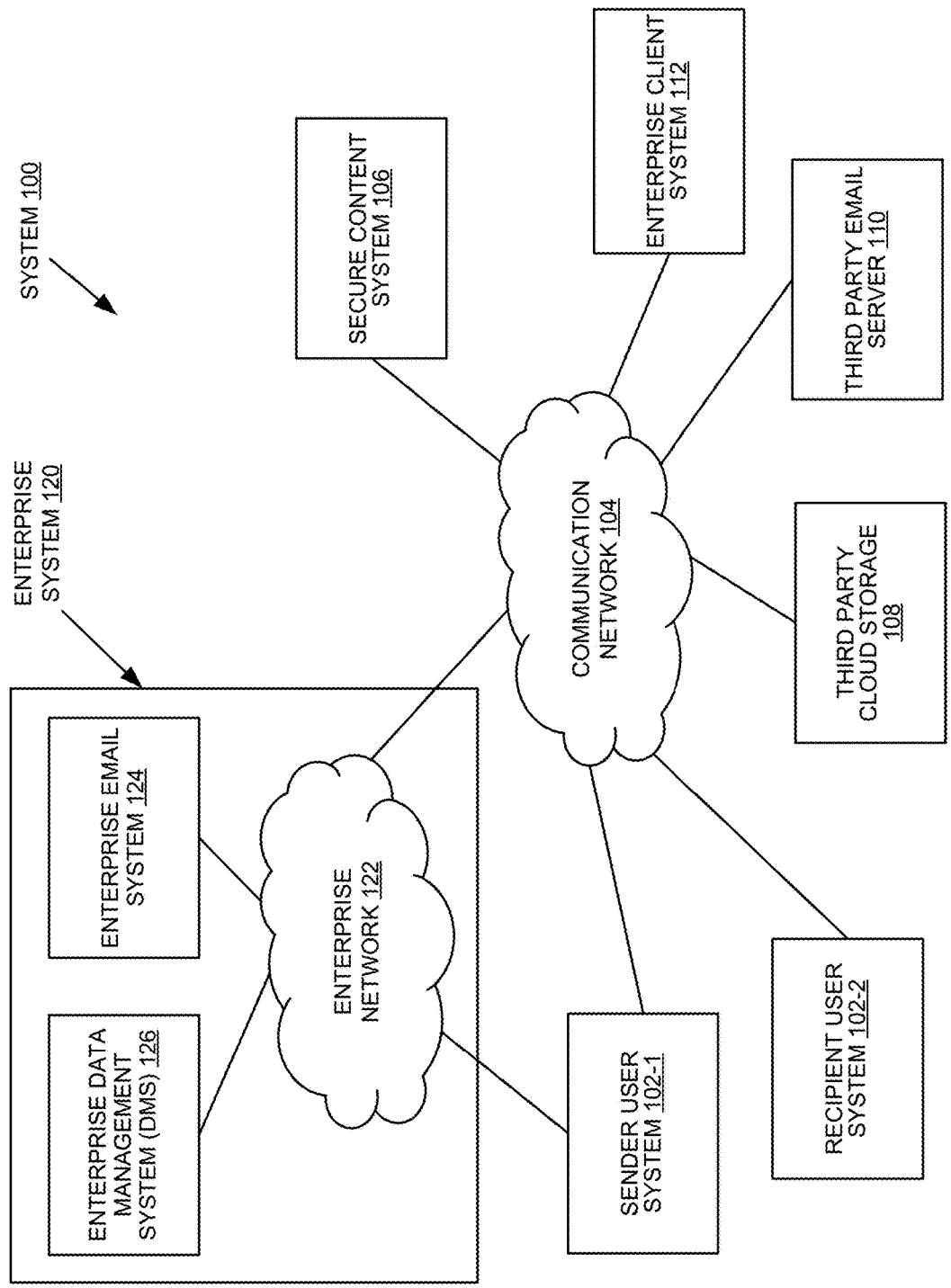
FIG. 1 depicts a block diagram of an example system for protecting contents and account according to some embodiments.
Figure 12:
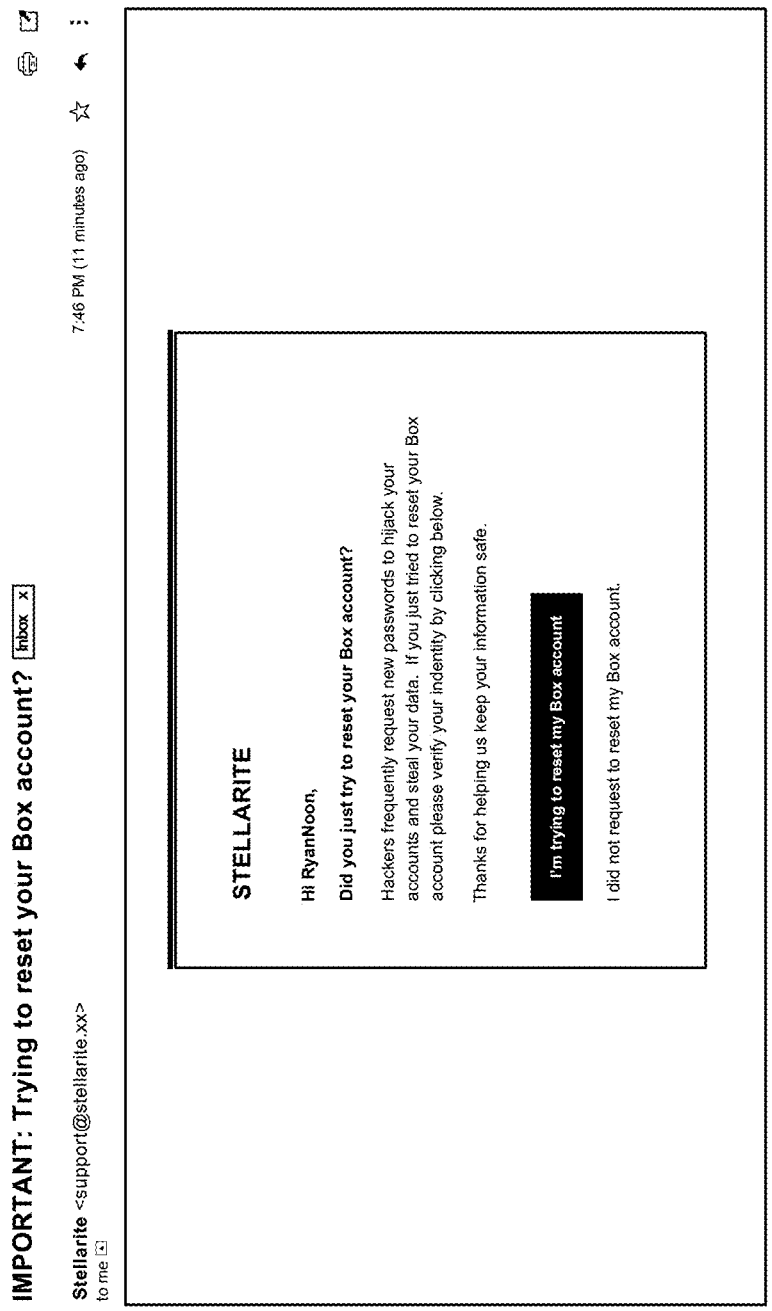
FIG. 12 depicts an example notification email according to some embodiments.

FIG. 1 depicts a block diagram of an example system 100 capable of protecting contents and accounts according to some embodiments. In this example, system 100 comprises a sender user system 102-1 and a recipient user system 102-2 (individually, user system 102 collectively), communication network 104, secure content system 106, third-party cloud storage 108, third-party email server 110, enterprise client system 112, and enterprise system 120. The enterprise system 120 comprises enterprise network 122, enterprise email system 124, and enterprise data management system (DMS) 126. User system 102, secure content system 106, enterprise client system 112 may each be or include any number of digital devices. A digital device is any device with a processor and memory. Digital devices are further discussed herein (e.g., see FIG. 12).

The user system 102 may be configured to facilitate communication between one or more users and other associated systems. In some embodiments, the user system 102 may be or include one or more mobile devices (e.g., smartphones, cell phones, smartwatches, table computer, or the like), desktop computers, laptop computers, and/or the like.

The communication network 104 may represent one or more computer networks (e.g., LAN, WAN, or the like). Communication network 104 may provide communication between any of user system 120, secure content system 106, and third-party cloud storage 108, third-party email server 110, and the enterprise system 120. In some implementations, communication network 104 comprises computer devices, routers, cables, uses, and/or other network topologies. In some embodiments, communication network 104 may be wired and/or wireless. In various embodiments, communication network 104 may comprise the Internet, one or more networks that may be public, private, IP-based, non-IP based, and so forth.

Users may interact with user system 102 using, for example, a web browser or mobile application to communicate with other users, access content (such as email from third-party email server 110 or enterprise email system 124), and/or access web pages on the enterprise client system 112. The users may also utilize user system 102 to interact with content, such as digital images, digital video, or the like stored in third-party cloud storage 108 or the enterprise data management system (DMS) 126. The third-party cloud storage 108 may be or include Apple iCloud storage.

The secure content system 106 may scan contents associated with an authorized user and identify sensitive data by evaluating the contents based on one or more security/sensitivity rules. For example, the one or more security rules may define particular keywords and/or phrases as sensitive. The secure content system 106 may scan a document, file, or email for those keywords and/or phrases identified by the one or more security rules. For example, if those keywords and/or phrases are found during the evaluation of the email that a sending user wants to send to a recipient user, the identified sensitive data may be replaced and/or stored by the secure content system 106.

Any amount of the sensitive information may be stored by the secure content system 106. In some embodiments, the secure content system 106 may store every paragraph containing sensitive information (e.g., containing any number of keywords or phrases known as sensitive based on the security rules, containing a number of keywords or phrases above a particular threshold defined by the security rules, and/or containing one or more particularly sensitive keywords or phrases relative to other keywords, phrases, or other content based on the security rules). In some embodiments, the secure content system 106 stores every sentence containing sensitive information. In various embodiments, the secure content system 106 determines a predetermined number of characters, words, phrases, sentences, paragraphs, sections, or the like in front and/or behind each keyword or phrase determined to be sensitive. The secure content system 106 may store the predetermined number of characters, words, phrases, sentences, paragraphs, sections, or the like in front and/or behind each keyword or phrase determined to be sensitive.

The secure content system 106 may generate a replacement email which contains a security link based on a security function to replace all or part of the sensitive data. The secure system 106 may replace the sensitive content (e.g., redact the sensitive content) with the security link (e.g., a stub). For example, the secure content system 106 may replace/redact every paragraph containing sensitive information (e.g., containing any number of keywords or phrases determined to be sensitive based on the security rules, containing a number of keywords or phrases above a particular threshold defined by the security rules, and/or containing one or more particularly sensitive keywords or phrases relative to other keywords, phrases, or other content based on the security rules). In some embodiments, the secure content system 106 may replace/redact every sentence containing sensitive information. As discussed herein, the secure content system 106 may determine a predetermined number of characters, words, phrases, sentences, paragraphs, sections, or the like in front and/or behind each keyword or phrase determined to be sensitive. The secure content system 106 may replace/redact the predetermined number of characters, words, phrases, sentences, paragraphs, sections, or the like in front and/or behind each keyword or phrase determined to be sensitive.

As a result, the secure system 106 may replace any portion of a document, file, and/or email (or attachment attached to an email) with a secure link that prevents a user accessing the particular document, file, and/or email from accessing the sensitive content without challenge. In one example, a user may receive an email containing sensitive information. Instead of opening the email and reading the sensitive information, the user may receive an email that includes a secure link that replaces all or some of the contents of the email (including the contents determined to be sensitive). In one example, there may be information (e.g., non-sensitive information) in the email and the sensitive content may be redacted and the secure link included in place of the redacted information. The recipient user may receive the replacement email and interact with the like to make a request to the secure content system 106 to access the sensitive data.

The function(s) triggered by interacting with the security link may challenge the recipient user and if the recipient user satisfies the security function, the sensitive data stored in the secure content system may be made available to the recipient user. For example, if the recipient user satisfies the security function(s), the secure system 106 may enable access to the original email, original attachment to the email (if any), and/or the sensitive content. For example, if the recipient user satisfies the security function, the secure system 106 may provide the sensitive content (e.g., redacted sensitive content) including one or more replaced/redacted paragraphs containing sensitive information (e.g., containing any number of keywords and/or phrases known as sensitive based on the security rules, containing a number of keywords and/or phrases above a particular threshold defined by the security rules, and/or containing one or more particularly sensitive keywords and/or phrases relative to other keywords, phrases, or other content based on the security rules), and/or the predetermined number of characters, words, phrases, sentences, paragraphs, sections, or the like in front and/or behind each keyword and/or phrase determined to be sensitive.

If the recipient user is not successful in satisfying the security function(s), the sensitive data may not made available to the recipient user. In some embodiments, after a predetermined time period, the sensitive data associated with the security link may no longer be available to the recipient user and/or any other requester that engages the security link to access the sensitive information.

The predetermined time may be determined in any number of ways. For example, the predetermined time period may be configured by the sender of the email, default rules of an organization, rules of an enterprise, group membership of the sender, or the like. Alternately or in addition, the predetermined time period may be dependent on the status of the email (e.g., the predetermined period starts after the recipient opens the email or upon sending of the email). By securing sensitive data within the secure content system 106, the sensitive data is secure from those that may obtain access to the email but are otherwise unauthorized to receive the contents of the email.

In some embodiments, the secure content system 106 stores one or more security rules. The security rules can be defined by the user system 102, enterprise system 120 (e.g., the sender's organization or a sub-organization of the enterprise of the enterprise system 120), and/or pre-defined in the secure content system 106. Each of the one or more security rules may be organized into security categories depending on criteria associated with each of the security rules. Security categories may organize security rules according to industry (e.g., healthcare, military, banking, or the like), organizational structure (e.g., temporary employees, external contractors, interns, executive, departments, or the like), sensitivity of information (e.g., personal information, client information, accounting information, trade secrets, technical information), remote vs. local recipients, recipients in other organizations or sub-organizations within the enterprise, and/or the like.

In various embodiments, different enterprise systems using the secure content system 106 may organize their security rules in their own set of security categories (e.g., security buckets). In some embodiments, different enterprise systems or user systems may store sensitive data in a respective partition of the secure content system 106, so that, for example, if an unauthorized user was able to gain access to the user system 102 and the sensitive data defined by the user system 102, sensitive data defined by the enterprise system 120 may be secure from the unauthorized user.

It will be appreciated that the secure content system 106 may receive or intercept an email, file, or document, redact sensitive information, store the sensitive information, generate a new email, file, or document with a secure link in place of all or some of the sensitive information (and potentially information that is not sensitive), and send the email, file, or document to the recipient.

In some embodiments, an originating sender may send an email using the enterprise email system 124 to a first plurality of recipients, if one of the first plurality of recipients designates the email or any of its contents or attachments (e.g., content of an attachment to the email) as sensitive, some or all parts of the email may be transferred from the enterprise email system 124 to the secure content system 106. Additionally, the email may be designated as sensitive for the remaining first plurality of recipients as well as the originating sender. If one of the first plurality of recipients, who may or may not be the recipient who designated the email as sensitive, forwards the email to a second plurality of recipients, the sensitive email designation may propagate to the second plurality recipients, and any subsequent recipients of the email. As a result, the secure content system 106 may intercept the email, scan the email and attachments for sensitive information, replace the sensitive information with a secure link, and provide the email including the secure link to the next recipients.

In some embodiments, a user of user system 102 may authorize the secure content system 106 to access the user's content such as an email account on the third-party email server 110 or a cloud storage account on the third-party cloud storage 108. In various embodiments, the secure content system 106 may configure the user's account or software to enable directing sent email from the user's email account to scan for secure content. In various embodiments, the secure content system 106 may associate an enterprise and/or security policies with the user and the user's email. In this example, the secure content system 106 may be configured to receive email sent by the user from the third-party cloud storage 108 and scan the email and/or attachments to the email for sensitive information based on the security policies. The third-party cloud storage 108 may replace all or some of the sensitive information with a security link (e.g., in the email and/or attachments to the email), before sending the email (or a replacement email as described herein) to the recipient.

In some embodiments, the secure content system 106 may monitor the user's email on the third-party email server for malicious attacks such as email including account maintenance communication requests such as a password reset request email. The secure content system 106 may store sensitive data from the account maintenance communication (e.g., a Uniform Resource Locator (URL) of the internet address to reset the password) or other information (e.g., such as account number which may be included as a part of the account maintenance communication to the secure content system 106). The secure content system 106 may notify the user using an alternate method of communication, such as a Short Message Service (SMS) or Multimedia Messaging Service (MMS) to contact the user and determine if the user initiated the account maintenance communication. If the secure content system 106 does not receive an indication that the user initiated the account maintenance, the secure content system 106 may lock the account or redact content requesting information that may be as a result of a phishing attack, spear phishing attack, or social engineering to prevent unauthorized access to the user's electronic accounts.

The third-party cloud storage 108 may provide remote data storage for digital content for one or more user systems 102 and/or the enterprise system 120. Cloud storage is becoming more popular and more users are using remote data servers such as the third-party cloud storage 108 to storage digital documents and software or applications. For example, many users today store their personal email and contact information, and even pictures, videos, and music archives on remote servers, and access that data using third-party applications that are provided through and controlled by a web-browser.

The third-party email server 110 may provide storage for email, such as Google Mail™, Hotmail™, and the like. The third-party email server 110 may distribute and synchronizes across multiple mailboxes and over wired and wireless networks.

The enterprise client system 112 may provide access to any users on system 100 of web pages hosted by the enterprise client system 112. In another example, the enterprise client system 112 may include remote users (e.g., recipients or senders) that receive or provide documents, files, or email with other users and/or devices (e.g., with one or more devices of the enterprise system 120, the sender user system 102-1, the recipient user system 102-2, and/or the like.

The enterprise system 120 may be any digital devices that provide resources, services, documents, files, email, media, and/or the like to one or more enterprises or organizations. In one example, the enterprise system 120 includes internal servers, networks, network devices, workstations, storage devices, application servers, document management servers, email systems, and/or the like. While the enterprise system 120 depicts a single network with two devices, it will be appreciated that the enterprise system 120 may include any number of networks with any number of devices. Further, It will be appreciated that the enterprise system 120 may include cloud resources such as Amazon S3 services, and/or the like that are used by the enterprise for enterprise-related businesses and/or functions. In the example depicted in FIG. 1, the enterprise system 120 may comprise the enterprise network 122, the enterprise email system 124, and the enterprise DMS 126.

In some embodiments, enterprise network 122 represents one or more computer networks (e.g., LAN, WAN, or the like). enterprise network 122 may provide communication between any of the enterprise email system, the enterprise DMS, any user of the enterprise system 120 including user 102-1 and other components of system 100. In some implementations, enterprise network 122 comprises computer devices, routers, cables, uses, and/or other network topologies. In some embodiments, enterprise network 122 may be wired and/or wireless. In various embodiments, communication network 104 may comprise the Internet, one or more networks that may be public, private, IP-based, non-IP based, and so forth. In various embodiments, enterprise network 122 includes a firewall or other forms of hardware or software that helps screen out hackers, viruses and worms trying to reach electronic components connected to the enterprise network 122.

The enterprise email system 124 may be any email systems and/or services for enabling creation, transmission, receipt, storage, reading, accessing, viewing, configuring settings, and/or the like of email (e.g., sent internally within the enterprise system 120 or externally outside the enterprise system 120).

The enterprise document management system (DMS) 126 may be used to hold and manage files (e.g., documents, images, audio, data, and/or the like) of the enterprise system 120. The enterprise DMS 126 may include information regarding employee records, client records, and other documents related to enterprise system 120.

It will be appreciated that content (e.g., sensitive and non-sensitive information) may include any kind of digital content or media, including, but not limited to pictures, text, video, sound, graphics, icons, interactive programming, or any combination of the above.

While the secure content system 106 is depicted as being in communication with the enterprise system 120, it will be appreciated that any number of different enterprises with different systems, users, email servers, and the like may utilize the same or any number of secure content systems 106. Similarly, there may be any number of third-party cloud storages 108, third-party email servers 110, and the like. In some embodiments, the security content system 106 is part of the enterprise system 120, and is not shared by different enterprises, with security rules and policies and secure storage all within the control of the enterprise system 120.

Figure 2:
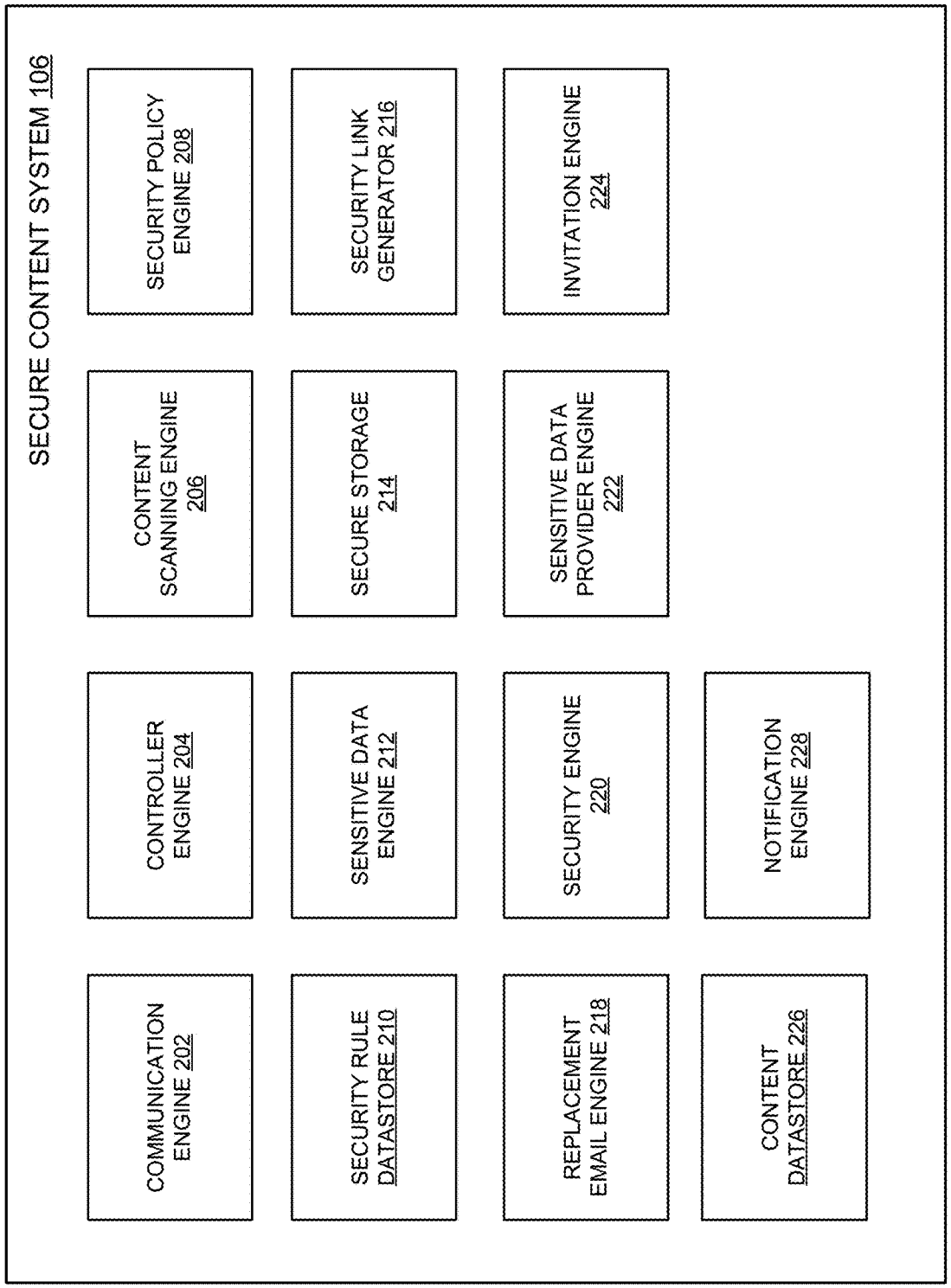
FIG. 2 depicts a block diagram of an example of a secure content system according to some embodiments.

FIG. 2 depicts a block diagram of the secure content system 106, from FIG. 1, according to some embodiments. The secure content system 106 includes communication engine 202, controller engine 204, content scanning engine 206, security policy engine 208, security rule datastore 210, sensitive data engine 212, secure storage 214, security link generator 216, replacement engine 218, security engine 220, sensitive data provider engine 222, invitation engine 224, content datastore 226, and notification engine 228.

The communication engine 202 may be configured to send and receive requests or data between secure content system 106 and any other component of system 100. In various embodiments, any number of devices of the enterprise system 120 may be configured to provide documents, files, and/or email (e.g., any item or object containing text) to the secure content system 106. In various embodiments, the enterprise email system 124 may be configured to direct email and/or other messages (e.g., SMS messages and the like) to the secure content system 106 prior to the message being directed to the intended recipient. Alternately, the secure content system 106 may otherwise intercept the messages. Similarly, in various embodiments, the enterprise email system 124 may be configured to direct documents and/or other files (e.g., SMS messages and the like) to the secure content system 106 prior to storing to, while being stored at, or prior to access from the Enterprise DMS 126 or any other storage. Alternately, the secure content system 106 may otherwise intercept the documents and/or other files using the communication engine 202.

The controller engine 204 may be configured to manage one or more of the various engines shown in FIG. 2. For example, the controller engine 204 may be configured to scan the email account of a user subscribed to secure content system 106 by facilitating the content scanning engine 206 to evaluate the contents of one or more email based on security rules to identify sensitive or suspicious data. In some embodiments, the controller engine 204 may be configured to respond to a security link generator request by facilitating the security link generator 216 to create one or more security links associated with sensitive or suspicious data.

The content scanning engine 206 may be configured to scan contents of an email, email attachment, document, file, or other item containing content. The content scanning engine 206 may scan contents (e.g., contained text or image(s) of contained text) for sensitive information based on one or more security policies (e.g., stored and/or created by the security policy engine 208).

The content scanning engine 206 may be configured to evaluate content such as email and/or email attachments from the third-party server 110 or enterprise email system 124 (e.g., subscribed to the secure content system 106). The content may be contained within the email and/or email attachments. The content may include textual components or images of such textual components.

In some embodiments, the content scanning engine 206 may perform textual recognition processes on the contents of the email. In some embodiments, the content includes digital images or digital video. In some embodiments, the content scanning engine 206 may perform image recognition or pattern recognition processes on email, email attachments, files, and/or documents. The content scanning engine 206 may be configured to evaluate the contents of the email, email attachments, files, and/or documents based on security rules to identify sensitive data or suspicious data.

In various embodiments, the content scanning engine 206 may perform optical character recognition on any number of email, email attachments, files, and/or documents including, for example, Adobe Acrobat files, images, and/or the like. It will be appreciated that the content scanning engine 206 may retrieve or receive any number of email, email attachments, files, and/or documents. For example, the content scanning engine 206 may identify the type or file attached to an email in order to determine what kind of processing may be required. The content scanning engine 206 may perform different processing on different file email attachment types. For example, the content scanning engine 206 may perform optical character recognition on image files or Adobe Acrobat files prior to scanning for sensitive information. In another example, the content scanning engine 206 may receive a Microsoft Word or other text file, and immediately scan for sensitive information without performing other operations. The content scanning engine 206 may perform any number of operations based on any type of email, email attachments, files, and/or documents.

The security policy engine 208 may be configured to create and/or retrieve one or more security policies. Each security policy may contain any number of security each security rule may indicate what information in a document, file, or email should be considered as sensitive. In one example, a security policy may contain any number of keywords or phrases that are associated with being sensitive. Any number of keywords or phrases may be associated as being sensitive. For example, keywords such as, but not limited to, accounting, technical, secret, intellectual property, proprietary, confidential, privileged, and the like may be considered to be indications of sensitivity by one or more security policy. It will be appreciated that keywords or phrases that are specific to the organization or sub-organization of an enterprise (e.g., groups of employees associated by department, function, seniority, subsidiary, relationship, and/or the like) may associated as being sensitive information. For example, keywords associated with specific technical, finance, personal, employee, software, or the like that is specific to the enterprise may be considered confidential by the enterprise. Similarly, keywords regarding executives, departments, domains, groups, projects, and or the like may also be considered to be sensitive. While keywords are described, it will be appreciated that phrases parts of words sentences and/or the like could be identified by one or more policies as being sensitive information. As described herein, keywords may refer to specific words, parts of words, phrases, paragraphs, sentences and/or any combination of words.

There may be any number of security policies. Each group within an enterprise may have one or more security policies and the keywords and phrases of each security policy of the group and/or the enterprise may be separate (e.g., exclusive) or contain any amount of similarity or overlap.

In various embodiments, a security policy may indicate how information is to be redacted from an email, document, or file. For example, the security policy may indicate that any paragraph or sentence containing one or more keywords or phrases determined to be sensitive should be redacted from the email, document, or file. In various embodiments, an employee, administrator, email sender, document creator, or the like, may define the redaction/replacement policy. In one example, an administrator may define a predetermined number of sentences, phrases, words, characters, and/or the like to redact or replace when a sensitive keyword or phrase is detected. In another example, an administrator may define a predetermined number of sentences, phrases, words, characters, and/or the like to redact or replace when a predetermined number of sensitive keywords and/or phrases are detected (and/or are when the predetermined number of sensitive keywords and/or phrases are detected within a predetermined number of paragraphs, sentences, phrases, words, or characters of each other). There may be different policies depending on the number and proximity of sensitive words and phrases to each other. For example, the administrator may include within the security policy that if there are three or more sensitive keywords and/or phrases within a paragraph, the paragraph should be replaced with a security link.

Alternately, the administrator may include within the security policy that each sentence containing any number of sensitive keywords and/or phrases should be redacted. In this example, if a user or recipient wishes to access the sentences containing the sensitive keywords and/or phrases, the user or recipient will have to overcome the security challenge(s) associated with the security link. The document, file, or email may include a single security link with any number of security functions to challenge the user (e.g., a password requirement) before the user may obtain access to all or some of the sentences containing the sensitive keywords and/or phrases.

The security policy engine 208 may be configured to select one or more security categories to apply to the content scanned by the content scanning engine 206. For example, depending on the user system 102 or enterprise system 120 that created, is to receive, that requested, that modified, that sent, and/or is otherwise associated with the email, attachment, document, or file, the security policy engine 208 may select different security categories to apply to the content. For example, a first security category which is applicable to the user system 102 may not be applicable to the enterprise system 120.

For privacy and security reasons, a particular user system or enterprise system may select from one or more security categories that are exclusive to the particular user system or enterprise system. Security categories may organize security rules according to industry (such as healthcare, military, banking), organizational culture (such as temporary employees, external contractors, interns, executive), domain, group membership, department membership, listserv, etc. In some embodiments, security rules may be further organized in levels of security, such as various levels of confidentiality, trade secret, and for executive eyes only. Once a security category has been selected, any number of security rules associated with the selected security category stored in the security rule datastore 210 may be used to evaluate the contents of the email.

Security rules and/or policies may be defined by a user, an enterprise, and/or may be pre-defined by the secure content system 106. Security rules may be organized into security categories depending on the criteria associated with each of the one or more security rules. Security categories may organize security rules according to industry (such as healthcare, military, banking), organizational culture (such as temporary employees, external contractors, interns, executive), domain, group membership, department membership, listserv, etc. In various embodiments, different enterprise systems using the secure content system 106 may organize their security rules in their respective security policies.

In some embodiments, an employee or other user may identify an email, attachment, keywords within the email and/or attachment, phrases within the email and/or attachment, or the like as containing sensitive information. For example, a sender of an email may identify the contents of an email or the email itself as containing sensitive information through the use of a menu email program or an application associated with the email application. The sensitive data engine 212 may receive these indications of data sensitivity and further update security rules and/or policies to default such information as being sensitive for future scans (e.g., adding keywords and/or phrases as being sensitive). As a result, if a second employee includes similar content previously marked as confidential or sensitive by a different employee, the secure content system 106 may identify such information as being sensitive even if the second employee did not mark the email or the content as being specifically sensitive.

Similarly, if the first employee identifies information as not being sensitive, then the sensitive data engine 212 may update the security rules and/or security policies to indicate that such information is not sensitive. It will be appreciated that the sensitive data engine to may make a statistical determination of keywords and/or phrases in order to identify content as being sensitive or not. The statistical determination may be based on any number of users or employees who mark do not mark information as being sensitive. It will be appreciated that the sensitive data engine 212 may relate certain employees higher than others based on their role within the organization, user rights, and/or the like.

In some embodiments, the secure content system 106 may utilize the security rules (e.g., as instructions) to identify sensitive information, redact/replace the sensitive information, generate secure link, recreate an email or document, determine authentication to receive/access the sensitive information, and/or authenticate based on challenges to the secure link.

In some embodiments, security rules may redact and create a security link to replace words, parts of words, phrases, sentences, paragraphs, sections, and/or the like that are identified as sensitive by one or more security rules. In one example, the communication engine 202 may receive an email from a user of an enterprise. The communication engine 202, the controller engine 204, or the sensitive data engine 212 may determine which security policy or policies to retrieve based on the email (e.g., based on the sender of the email, the email server that provided the email, group or department of the sending user, recipient of the email, per department of the recipient, whether the recipient is internal to the organization or external, whether the email is to go between departments or outside of the enterprise network, or the like). The content scanning engine 206 may scan contents of the email and/or the email attachments if any for sensitive information utilizing one or more rules of the one or more policies. If sensitive information is found, the sensitive data engine 212 may redact, replace, and/or store the sensitive information. The security link generator 216 may generate a secure link and one or more security challenge(s) based on the one or more rules of the one or more policies.

In various embodiments, security rules may create a security link to replace any number of sections, paragraphs, sentences, phrases, words, or characters that contain one or more words that are identified as sensitive by one or more security rules. In various embodiments, security rules may redact and create a security link to replace the contents of an entire email, attachment, document, or file that contains one or more words that are identified as sensitive by one or more security rules. In some embodiments, security rules will redact/replace the entire contents of an email or attachment if it matches a template of an account maintenance communication, or contain keywords associated with the account maintenance communication. The account maintenance communication may include password reset request email or an account change notification email. This is further described herein.

The security rule datastore 210 may be any structure and/or structures suitable for storing data entries or records (e.g., an active database, a relational database, a self-referential database, a table, a matrix, an array, a flat file, a documented-orientated storage system, a nonrelational No-SQL system, an FTS-management system such as Lucene/Solar, and the like). The security rule data store may store security rules and/or security policies containing security rules.

As discussed herein, it will be appreciated that the secure content system 106 can support any number of enterprise systems. As such there may be any number of security policies and associated security rules for different enterprises. In some embodiments each enterprise will have its own security policies containing its own security rules. It will be appreciated that the secure content system 106 may define a default set of security rules for any number of enterprises or organizations within an enterprise.

In various embodiments the secure content system 106 may learn keywords and/or phrases that indicate sensitive information for different departments within an organization. The secure content system 106 may recommend keywords and/or phrases to different enterprises based on similarity of function, similarity of industry, similarity of sensitive information, or the like. For example information regarding board meetings such as minutes of board meetings, accounting information, categories of employee information, salaries, health information, passwords, and/or the like may be considered as indications of sensitive information across enterprises and organizations within those enterprises. As such the secure content system 106 may recommend keywords and phrases that indicate such categories of information as being potentially sensitive to any number of enterprises and/or organizations within enterprises.

In some embodiments, the sensitive data engine 212 is configured to evaluate content using the one or more security rules in the security category selected by the security policy engine 208 and identify the sensitive data within the content. Security rules may be based on metadata, for example, a security rule may recognize financial statements as sensitive data by looking for keywords such as "quarterly," "financial," "subtotal," and the like.

In various embodiments, the sensitive data engine 212 may apply any analytics depending on the content of an email, attachment, document, or file. For example, the sensitive data engine 212 may identify a category of sensitivity such as "accounting" and detect a number of words or phrases associated with accounting. The sensitive data engine 212 may identify each word and/or phrase associated with accounting, determine proximity of the words and/or phrases considered to be sensitive, evaluate metadata, assess structure and format of the content and/or sensitive words and/or phrases, assess the number of words and/or phrases, and the like to generate a confidence score. The confidence score may be compared to a predetermined threshold (e.g., defined by the enterprise or the secure content system 106) to determine if any amount or all of the content is sensitive. It will be appreciated that there may be different predetermined thresholds and different scoring functions may be utilized based on different categories of sensitivity (e.g., indicating different analytics, scoring functions, and/or thresholds for different categories including, for example, accounting, legal issues, finance, personal information, trade secrets, or the like). The categories of sensitivity, analytics to be used, scoring functions, and/or thresholds may be defined in the security policy.

Once sensitive data has been identified it may be stored within secure storage 214. In some embodiments, security rules may evaluate the content for account maintenance communications such as a password reset request email. In various embodiments, security rules may evaluate the sender or recipients of the email to determine if an email should be designed as sensitive, or contains sensitive data. For example, a security rule may identify an email as sensitive if a particular person in the enterprise system 120 is the sender or one of a plurality of recipients. In some embodiments, sensitive data engine 212 may be configured to perform textual recognition processes on the contents of the email to identify sensitive data. In various embodiments, the contents includes digital images, digital video and the sensitive data engine 212 may perform image recognition or pattern recognition processes to identify sensitive data.

Secure storage 214 may be any structure and/or structures suitable for storing data entries or records (e.g., an active database, a relational database, a self-referential database, a table, a matrix, an array, a flat file, a documented-orientated storage system, a nonrelational No-SQL system, an FTS-management system such as Lucene/Solar, and the like). The secure storage 214 may be encrypted. It will be appreciated that the secure storage 214 may include any number of storage devices and/or storage networks. Sensitive information may be stored in various different locations and encrypted by any number of encryption keys and or security methodologies.

While the secure storage 214 may be depicted in secure content system 106, it will be appreciated that in some embodiments there may not be a secure storage 214. For example, the secure content system 106 may store the sensitive information of a particular enterprise in storage resident in or owned by that particular enterprise. For example, a document containing sensitive information may be retrieved or accessed by the secure content system 106 to determine if that particular document contains sensitive information based on security rules of security profiles. A copy of the document containing a secure link that replaces the sensitive information may be provided back to the document management system and/or to a user. The original document may remain in its original location or be moved to a secure location by the enterprise or by the secure content system 106 depending on embodiments.

In another example, the sender of an email may retain the original email with the original contents in their "sent" file of their enterprise email server. The secure content system 106 may receive the email and transmission to the recipient, scan the email for sensitive information, generate a new email with a secure link in place of the sensitive information, and provide the new email including the secure link to the intended recipient. The secure content system 106, instead of storing the sensitive information within the secure storage 214, may associate the sensitive information with the original email in the enterprise server and/or the sender's "sent" email box.

In some embodiments, the security link generator 216 may be configured to generate a security link which links to the secure storage 214 (or the location of the sensitive information) where one of a plurality sensitive data identified by the sensitive data engine 212 is located or is otherwise accessible.

In some embodiments, the security link generator 216 generates different security links for different sensitive data (e.g., different keywords and/or phrases) in the email. For example, different keywords and phrases may be associated with highly sensitive confidential information while other keywords and phrases may be associated with less sensitive confidential information. It will be appreciated that, in some embodiments, the security rules may require different levels of challenges and therefore different levels of security functions depending on the type of keywords and phrases (e.g., categories of keywords and phrases associated with different levels of confidential information).

In some embodiments, if there is a particular email containing keywords and phrases associated with highly sensitive confidential information and other keywords and phrases associated with less sensitive confidential information, the security link generator 216 generates a single security link using security rules associated with the highly sensitive confidential information. In various embodiments, in the case of the particular email containing keywords and phrases of different levels of confidentiality, the security link generator 216 generates a different security link for each of the different levels of confidentiality.

In some embodiments, the security link is linked to one or more security functions that must be satisfied before a requester can access the sensitive data. In one example the security link is a hyperlink or other executable code that presents a user (e.g., an email recipient or document recipient) with a challenge before being able to access the sensitive information. The challenge, for example, may be a password request which requests a password from the user before allowing the user to access the sensitive information. The security link may require any amount of information. For example, the security link may require that the user be logged into an enterprise system, utilizing a digital device behind an enterprise firewall, utilize a digital device with a particular domain name or MAC address, have an active VPN connection, be a member of a particular domain or group, possess one or more encryption keys, be able to provide one or more codes from other devices in the user's possession (e.g., two factor authentication), and/or any combination of the above.

In various embodiments, the security link may link the user to a part of the secure content system 106 and/or a part of the enterprise system. The secure content system 106 and/or the enterprise system may select and/or create one or more challenges based on the security link (e.g., based on an ID number associated with the security link), the security rules, the type of confidential information, and/or any other criteria.

The security function may be location or time-based. For example, the security function may be satisfied if the secure engine 220 determines that the requester is currently at the location of the company offices during office hours (e.g., based on GPS sensor readings of a digital device of the requester) at the time the request is received. A requester is any user or digital device that activates the security link.

As discussed herein, the security function may provide a request to the requester to enter a password or answer a security question selected by the sender of the email, a representative of the sender of the email, administrator, document creator, file creator, attachment creator, or a user with the appropriate rights. In some examples, the security function may require biometric authentication such as facial recognition, fingerprint, voiceprint, or some combination thereof.

In various embodiments, the security link generator 216 may generate a security link that replaces the entire contents or part of an email, attachment, document, and/or file. The security link may comprise one security function which must satisfied before any requester can access the sensitive data associated with the security link. In some embodiments, the security link may comprise a plurality of security functions, the plurality of security functions may be from a same level of security. In some embodiments, as long as one of the plurality of security functions is satisfied, the requester can access the sensitive data associated with the security link. In various embodiments, all security functions or a combination of security functions must be satisfied before the requester may access the sensitive data.

In some embodiments, replacement engine 218 generates a replacement email, attachment, document, or file which includes the security link generated by the security link generator 216. For example, the replacement engine 218 replaces or redacts the sensitive information with the security link. The replacement engine 218 may replace or redact content containing sensitive information (e.g., containing any number of keywords or phrases known as sensitive based on the security rules, containing a number of keywords or phrases above a particular threshold defined by the security rules, and/or containing one or more particularly sensitive keywords or phrases relative to other keywords or other content based on the security rules), and/or the predetermined number of characters, words, phrases, sentences, paragraphs, sections, or the like in front and/or behind each keyword.

It will be appreciated that the replacement engine 218 may replace different portions of content based on different security rules. For example based on the sensitive information and or physician related to the sensitive information, different security rules may replace different amounts of information. In some embodiments, the replacement engine 218 may replace the same amount of information. For example the replacement engine 218 may replace every sentence or paragraph containing keywords or phrases identified by the security rules.

In some embodiments, after the replacement engine 218 replaced confidential information from an email, the communication engine 208 may send the replacement email to a recipient user. The replacement email may not include the sensitive data identified by the sensitive data engine 212. In various embodiments, the replacement email includes additional information regarding the suspicious content, such as a warning of a potential phishing scam. In some embodiments, replacement engine generates a replacement content such as an image, spreadsheet, video, etc.

In various embodiments, the replacement engine 218 may also include additional information such as an explanation that sensitive information was replaced and instructions on how to access the sensitive information. For example, the replacement engine 218 may provide instructions on how to engage the security link and provide information to meet requirements for authentication or security challenges. In another example, the replacement engine 218 may provide instructions for the recipient to contact an administrator or a sender to resolve problems or challenges related to the sensitive information and/or security functions.

In some embodiments, the security engine 220 is configured to receive a request to access the sensitive data from the requester interacting with the security link in the replacement email. As discussed herein, a requester is a person who receives or attempts to access a document, file, or email, and interacts with a security link.

In some embodiments, the security engine 220 receives a response to the security function from the requester, and determines if the security function is satisfied. Providing that the security function is satisfied, the security engine 220 may send a request to the sensitive data provider engine 222 for the sensitive data related to the satisfied security function or otherwise enables the recipient access to the sensitive information.

The security engine 220 may determine if the security function is satisfied in any number of ways. In one example, the security engine 220 may receive a password from the recipient and determine if it matches the expected value in the security function. In another example, the security engine 220 may confirm an encryption key, code, MAC address, biometric value, and/or any other information provided by the requester or the requester's device. In a further example, the security engine 220 may confirm the location of the requester or location of the requester's device. The security engine 220 may also confirm the time of day and/or the date that the request was received and or the document, file, email, or security link was created or provided.

It will be appreciated that the security engine 220 may also provide additional information or additional challenges to the recipient. If the recipient does not sufficiently answer a challenge, provides insufficient information, or does not provides an answer during a predetermined time period, the security engine 220 may be configured to provide additional challenges or provide messages or other alerts to administrators of the failed attempt. In some embodiments the security engine 220 may refuse to accept any other attempts at satisfying security functions if the recipient fails to satisfy one or more security challenges.

In various embodiments, the security engine 220 determines the appropriate security challenge and/or determines the sufficient answer to the security challenge based on security rules and/or security profiles.

In various embodiments, the security engine 220 may be configured to trigger a "lock down" on a user email account, a cloud storage account, or an enterprise email account and the like, if the user is notified of an account maintenance communication, such as a password reset request, and the user indicates that the user did not initiate the maintenance communication. In some embodiments, the presence of a software plug-in, in an internet browser of the user system 102-1 for example, may satisfy the security function.

In some embodiments, the sensitive data provider engine 222 is configured to provide or receive requests or data between the secure storage 214, the security engine 220 and any other component of system 100. The sensitive data provider engine 222 may receive a request from security engine 220 for sensitive data, providing that the security function is satisfied. The sensitive data provider engine 222 may, in turn, sends a request to the secure storage 214 for the sensitive data related to the satisfied security function.

The invitation engine 224 may be configured to send requests to user systems or enterprise systems to subscribe to the secure content system 106. In some embodiments, the invitation engine 224 is configured to invite email recipients or senders to join the secure content system 106. For example, an employee of an enterprise system may request a common recipient of the employees email to be more secure in their email communications. As such, the employee may control the invitation engine 224 to send the recipient an invitation. The invitation engine 224 may generate an invitation and associate that invitation with the recipient and/or a unique identifier. The unique identifier may identify the enterprise and/or the employee. If the recipient accepts the invitation and invitation acceptance is sent to the invitation engine 224. The invitation engine 224 may then add the recipient's email address and any other information regarding the recipient (e.g., including for example the recipient's name, MAC address, encryption keys, passwords, logins, and the like).

In some embodiments, after the invitation has been accepted, email from the recipient to the enterprise may be intercepted by the secure content system 106. In one example, the recipient (now a sender of email to the employee) may send the email directly to the secure content system 106 or email that is sent by the recipient to the enterprise system may be redirected by the enterprise system to the secure content system 106. Subsequently, the secure content system 106 may identify the email from the recipient, identify the correct security policies, scan the email for sensitive information, generated new email with replaced sensitive information and a security link, and send the new email to the employee.

In some embodiments, after the invitation has been accepted email from the employee to the recipient may no longer be scan for sensitive information may be scan for only a subset of sensitive information depending on the policy rules.

It will be appreciated that, in some embodiments, unless the recipient accepts the invitation, the secure content system 106 may, in some instances, not scan email for sensitive information and replace sensitive information with a link in order not to disrupt business. In some embodiments, an employee may request secure content system 106 not replace sensitive information (or scan for sensitive information) of a particular email thread, attachment, document, or file for a limited time. In one example, this may allow the employee to have multiple revisions and discussions without having to overcome recurring challenges either by himself or by the recipient. In some embodiments, certain employees with specific authorization as defined by the security rules and or security policy may have the option to suspend all or some services of secure content system 106 (including for example not scanning certain documents, email, or files for sensitive information or replacing sensitive information in those documents, emails, or files with secure links).

Content datastore 226 may be any structure and/or structures suitable for storing data entries or records (e.g., an active database, a relational database, a self-referential database, a table, a matrix, an array, a flat file, a documented-orientated storage system, a nonrelational No-SQL system, an FTS-management system such as Lucene/Solar, and the like). Content from different users or enterprise associated with secure content system 106 may be stored in different partitions of and/or different locations associated with the content datastore 226, so that if an email account of the user system 102-1 is hacked, content associated with the enterprise DMS 126 will not be affected.

In some embodiments, the replacement email generated by the replacement engine 218 is stored in the content datastore 226, and in various embodiments, after the replacement email is generated by the replacement engine 218, the email may be deleted from the third-party email server 110 or the enterprise email system 124. In some embodiments, all of the email from a user's email account on the third-party email server, such as AOL mail may be deleted from the third-party email server and transferred to the content datastore 226. In some embodiments, people who send email to the user's cloud or other email services (e.g., AOL mail), may be seamlessly forwarded to the content datastore 226. The user will be able to send and receive email using the AOL mail but still be able to keep their email and other content more secure than on the AOL mail server.

Notification engine 228 is configured to notify the user of changes in the user's content or accounts. In some embodiments, the secure content system 106 can provide additional services based on content scanned the email or document. For example, a common malicious attack on an email recipient may be a phishing scam requesting personal information, credit card numbers, logins, passwords, and the like. Another common malicious attack, may be a phishing or spear phishing attack requesting the user to provide personal information or to change a password on an email account that the user may have even though the email is not the user's email system. The secure content system 106, upon determining this type of email content, may notify the recipient that this is a common attack or a likely malicious email.

In some embodiments, the notification engine 228 sends SMS or MMS messages to the user to determine if the user initiated an account maintenance communication (e.g., an email requesting a change of password or confirmation of other personal information). In one example, the notification engine 228 may send the message to the user's personal mobile device or any other digital device to allow the user to be notified in two different ways and/or on two different devices for security. In various embodiments, the notification engine 228 informs a sender of an email with sensitive data that one or more recipients of the email have successfully (or unsuccessfully) accessed the sensitive data. For example, the notification engine 228 notifies the user by using email, text messaging, telephone call, and/or other forms of notification.

It will be appreciated that content may include any kind of digital content or media, including, but not limited to pictures, text, video, sound, graphics, icons, interactive programming, or any combination of the above.

Figure 3:
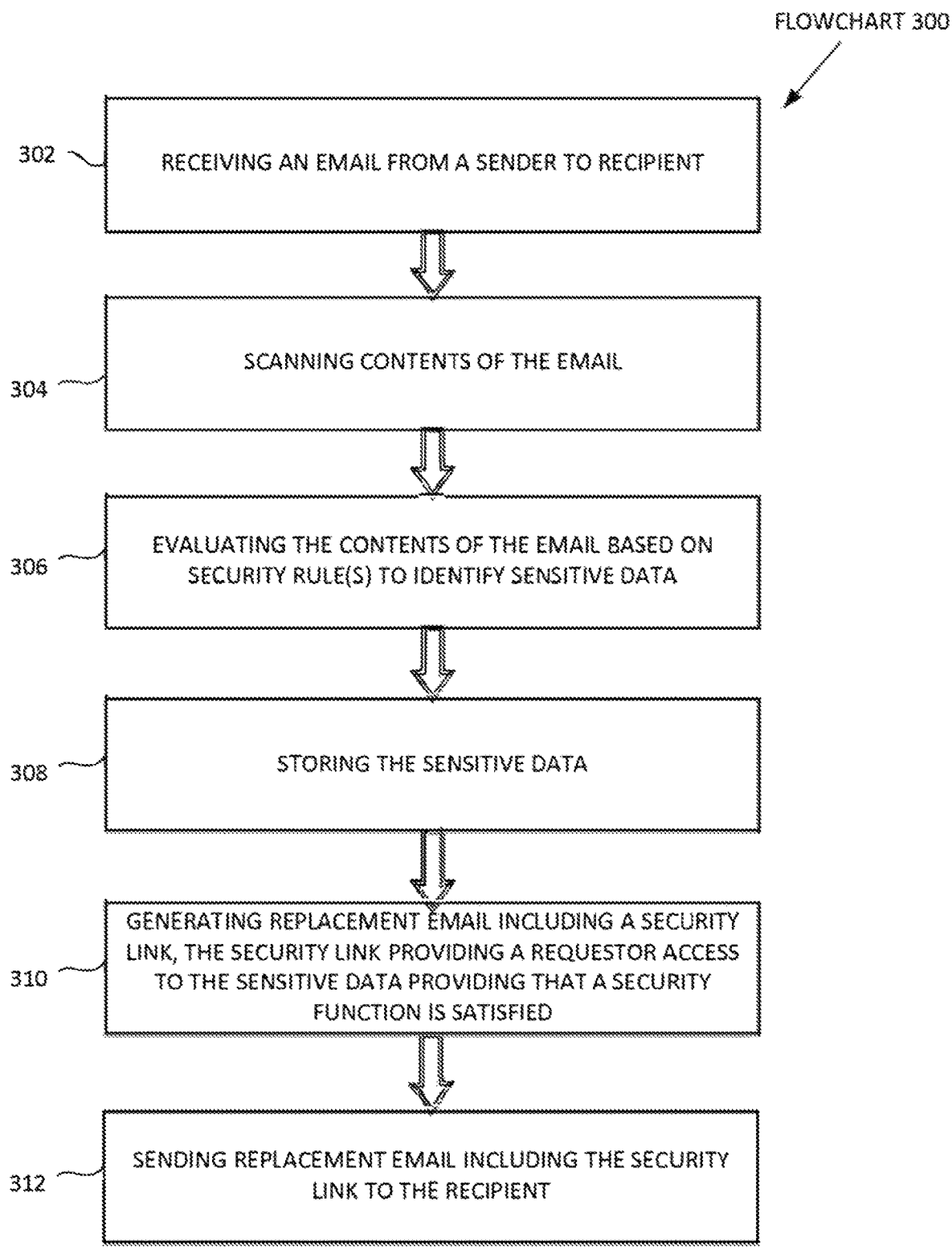
FIG. 3 depicts a flowchart of the process of securing contents according to some embodiments.

FIG. 3 depicts a flowchart 300 of the process of securing contents in some embodiments. In step 302, the communication engine 202 facilitates a request from sender user system 102-1 to send an email from the sender user system 102-1. The secure content system 106 may monitor the sender user system 102-1's email communications on the enterprise email system 124. For example, in some embodiments the enterprise email system 124 may receive email from the sender user system 102-1 and provide that email to the communication engine 202. In some embodiments, the user system 102-1 (e.g., a browser, email application, or other application) may be configured to provide the email to the secure content system 106 before the enterprise email system 124 receives the email.

In step 304, the content scanning engine 206 of the secure content system 106 may be configured to evaluate the email from the enterprise email system 124. In one example, the content scanning engine 206 may be configured to identify the correct security policies and/or security rules based on information of the email (e.g., based on the sender, recipient, user system 102-1, identifier in the email, metadata associated with the email, MAC address, or any other information). The content scanning engine 206 makes scan the contents of the email or sensitive information based on the security policies and/or security rules.

Figure 8:
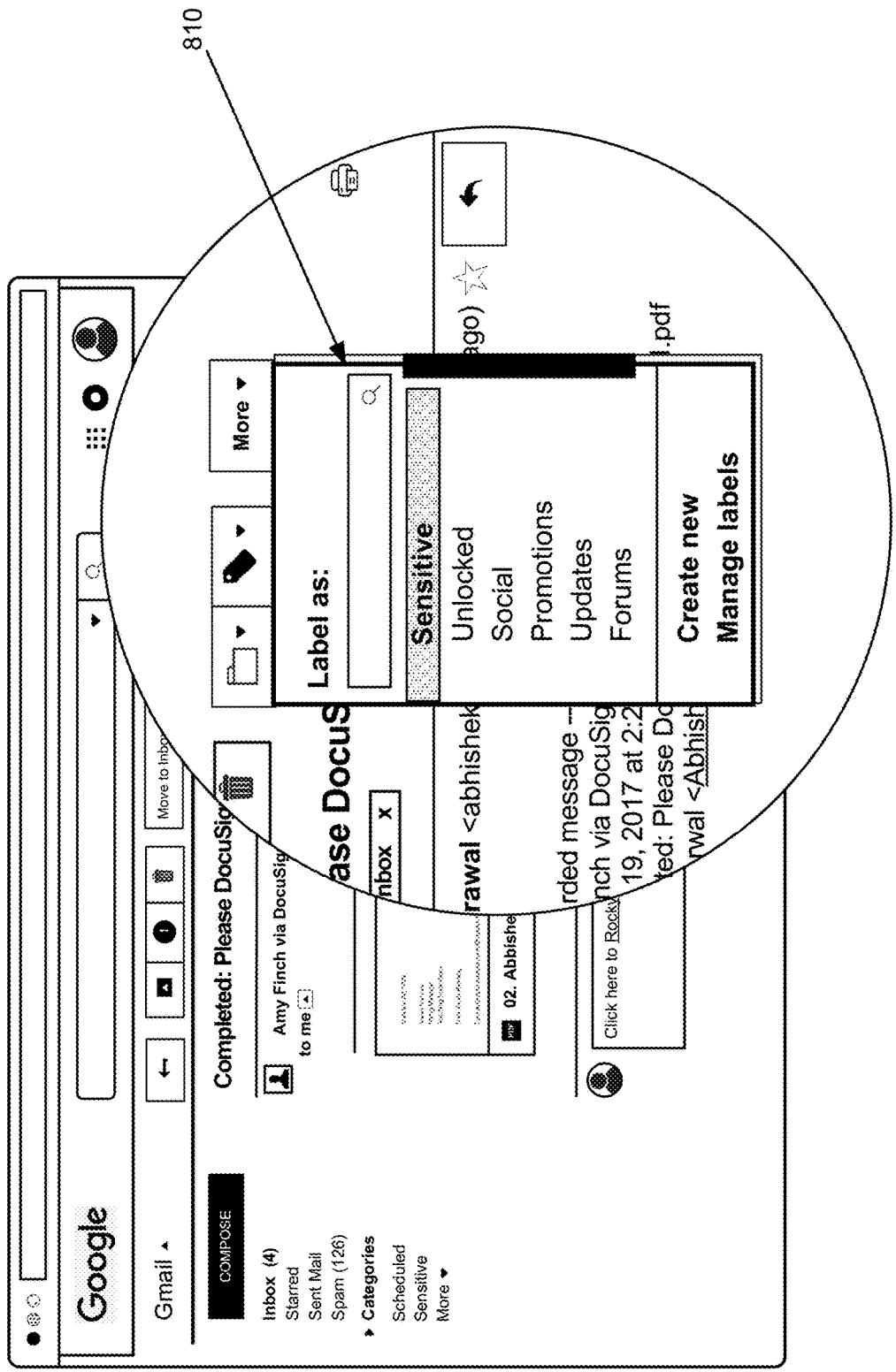
FIG. 8 depicts an example email designating interface according to some embodiments.

In step 306, the sensitive data engine 212 may be configured to evaluate the contents of the email based on the security rules to identify sensitive data or suspicious data. In some embodiments, the security policy engine 208 may be configured to select one or more security categories to apply to the content scanned by the content scanning engine 206. Once a security category has been selected, security rules associated with the selected security category stored in the security rule datastore 210 may be used by the sensitive data engine 212 to evaluate the contents of the email to identify sensitive data. The user of sender user system 102-1 may designate an email as sensitive, such as the email designating interface 810 in FIG. 8. The content may be contained within an email and may include textual components. In some embodiments, the content scanning engine 206 may perform textual recognition processes on the contents of the email. In some embodiments, the content includes digital images, digital video and the content scanning engine 206 may perform image recognition or pattern recognition processes.

In step 308, the sensitive data identified by the sensitive data engine 212 may be stored in secure storage 214. In various embodiments, the sensitive data identified by the sensitive data engine 212 may be stored in any location such as but not limited to the enterprise system.

In step 310, the security link generator 216 may be configured to generate a security link that must be satisfied in order to access the sensitive data. In some embodiments the security link may point to the location (e.g., memory address) within secure storage 214 where one of a plurality sensitive data identified by the sensitive data engine 212 is stored. The security link may be associated with one or more security function(s) that must be satisfied before a requester (e.g., a user or device that interacts with the security link) can access the sensitive data. In some embodiments, the requester is the recipient of the email, or a representative of the recipient of the email. The security link may be included in a replacement email generated by replacement engine 218.

Although termed as a "replacement email," it will be appreciated that all or part of the email may be replaced with a security link and the original email may be directed to the recipient. In some embodiments the original email is replaced with a similar email but lacking the sensitive information and including the security link before sending onto the recipient (or the recipient's mailbox).

In some embodiments, the replacement email does not include the sensitive data identified by the sensitive data engine 212, but would include a secure link which contains a security function. The security function issues a challenge to the requester, the challenge presented to the user may require the requester to enter a password or answer a security question selected by the sender of the email, or a representative of the sender of the email. In some embodiments, the sender of the email determines the type of security function presented to subsequent recipients of the email. In various embodiments, the enterprise system 120 determines the type of security function presented to subsequent recipients of the email according to a level of sensitivity of the email.

In step 312, the communication engine 202 facilities a request to send the replacement email generated by the replacement engine 218 to the recipient user system 102-2. In the above example, contents secured by the secure content system 106 is an email. In various embodiments, the contents may include digital images, digital videos.

The secure content system 106 may proactively scan any number of emails and any email storage system to identify secure or sensitive information. The secure content system 106 may develop or update security rules and/or security profiles based on the scan. In some embodiments, the secure content system 106 may replace the sensitive information and any other information based on security rules with a secure link. In one example the secure content system 106 may store the sensitive information elsewhere. As a result, email stored in the email server, email mailbox, or the like may include copies of email without the sensitive information. If a malicious user gains access to the email server or email mailbox, then the malicious user would still have to overcome the challenge of the security link. It will be appreciated that any number of mailboxes or accounts may be scanned and sensitive information removed from any number of emails. In some embodiments, some mailboxes or accounts may be scanned and sensitive information withdrawn while other mailboxes or accounts may not be scanned, depending on the owner of the mailbox, security rules, or any other reason.

In various embodiments, the secure content system 106 may store the sensitive information and/or any scanned information to enable for faster searching of both sensitive and non-sensitive information contained in any number of email, documents, or other files. For example, the secure content system 106 may store all or parts of the scanned information in a database or other data structure to enable fast searching of information. In this way the user may be able to search through all of their email, documents, or other files, in search of information without concern that sensitive information may not be found during a search.

It will be appreciated that the secure content system 106 is not limited to email or other messages, but may provide access and security to documents and other files. For example, in step 302, the communication engine 202 may receive a request to access a document stored in a document management system (e.g., enterprise DMS 126) or other storage. The secure content system 106 may monitor communications with the enterprise DMS 126 and/or the enterprise DMS 126 (or other device) may route requests for documents or files (or the documents or flies themselves) through the secure content system 106.

In step 304, the content scanning engine 206 of the secure content system 106 may be configured to evaluate the document of file. In one example, the content scanning engine 206 may be configured to identify the correct security policies and/or security rules based on information of the document, information of the file, or the request (e.g., based on the requester, the DMS, the enterprise, the type of content of the document or file, or any other information). The content scanning engine 206 makes scan the contents of the document or file for sensitive information based on the security policies and/or security rules.

In step 306, the sensitive data engine 212 may be configured to evaluate the contents of the document or file based on the security rules to identify sensitive data or suspicious data. In some embodiments, the security policy engine 208 may be configured to select one or more security categories to apply to the content scanned by the content scanning engine 206. Once a security category has been selected, security rules associated with the selected security category stored in the security rule datastore 210 may be used by the sensitive data engine 212 to evaluate the contents of the document or file to identify sensitive data.

In various embodiments, a document administrator, secretary, or user that initially stored the document or file may designate an email as sensitive. The content may be contained within an document or file and may include textual components. In some embodiments, the content scanning engine 206 may perform textual recognition processes on the contents of the document or file. In some embodiments, the content includes digital images, digital video and the content scanning engine 206 may perform image recognition or pattern recognition processes.

In optional step 308, the sensitive data identified by the sensitive data engine 212 may be stored in secure storage 214. In various embodiments, the sensitive data identified by the sensitive data engine 212 may be stored in any location such as but not limited to the enterprise system.

In step 310, the security link generator 216 may be configured to generate a security link that must be satisfied in order to access the sensitive data. In some embodiments the security link may point to the location (e.g., memory address) within secure storage 214 where one of a plurality sensitive data identified by the sensitive data engine 212 is stored. The security link may be associated with one or more security function(s) that must be satisfied before a requester (e.g., a user or device that interacts with the security link) can access the sensitive data. In some embodiments, the requester is the recipient of the email, or a representative of the recipient of the email. The security link may be included in a replacement document or file generated by replacement engine 218.

Although termed as a "replacement document or file," it will be appreciated that all or part of the document or file may be replaced with a security link and the original document or file may be directed to the user seeking to access the document or file. In some embodiments the original document or file is replaced with a similar document or file but lacking the sensitive information and including the security link before sending onto the recipient (or the recipient's mailbox).

In some embodiments, the replacement document or file does not include the sensitive data identified by the sensitive data engine 212. The security function issues a challenge to the requester, the challenge presented to the user may require the requester to enter a password or answer a security question (e.g., selected by the author or user that stored the document or file). In some embodiments, the author or user that stored the of the document or file determines the type of security function presented to subsequent recipients of the document or file. In various embodiments, the enterprise system 120 determines the type of security function presented to subsequent recipients of the document or file according to a level of sensitivity of the document or file (or content).

In step 312, the communication engine 202 facilities a request to send the replacement document or file generated by the replacement engine 218 to the recipient user system 102-2. In the above example, contents secured by the secure content system 106 is an document or file. In various embodiments, the contents may include digital images, digital videos.

Figure 4:
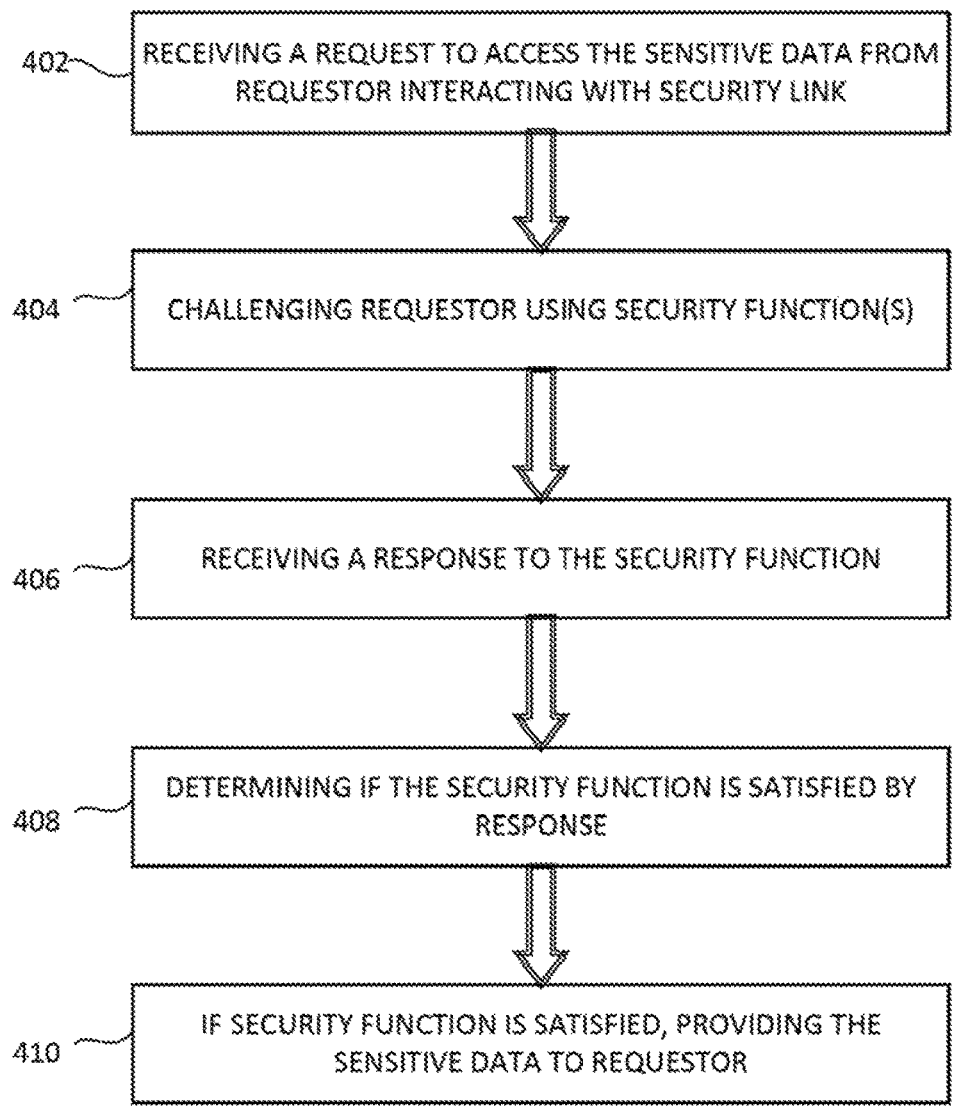
FIG. 4 depicts a flowchart of an example process of challenging a requester before retrieving sensitive data from the secure storage.
Figure 9:
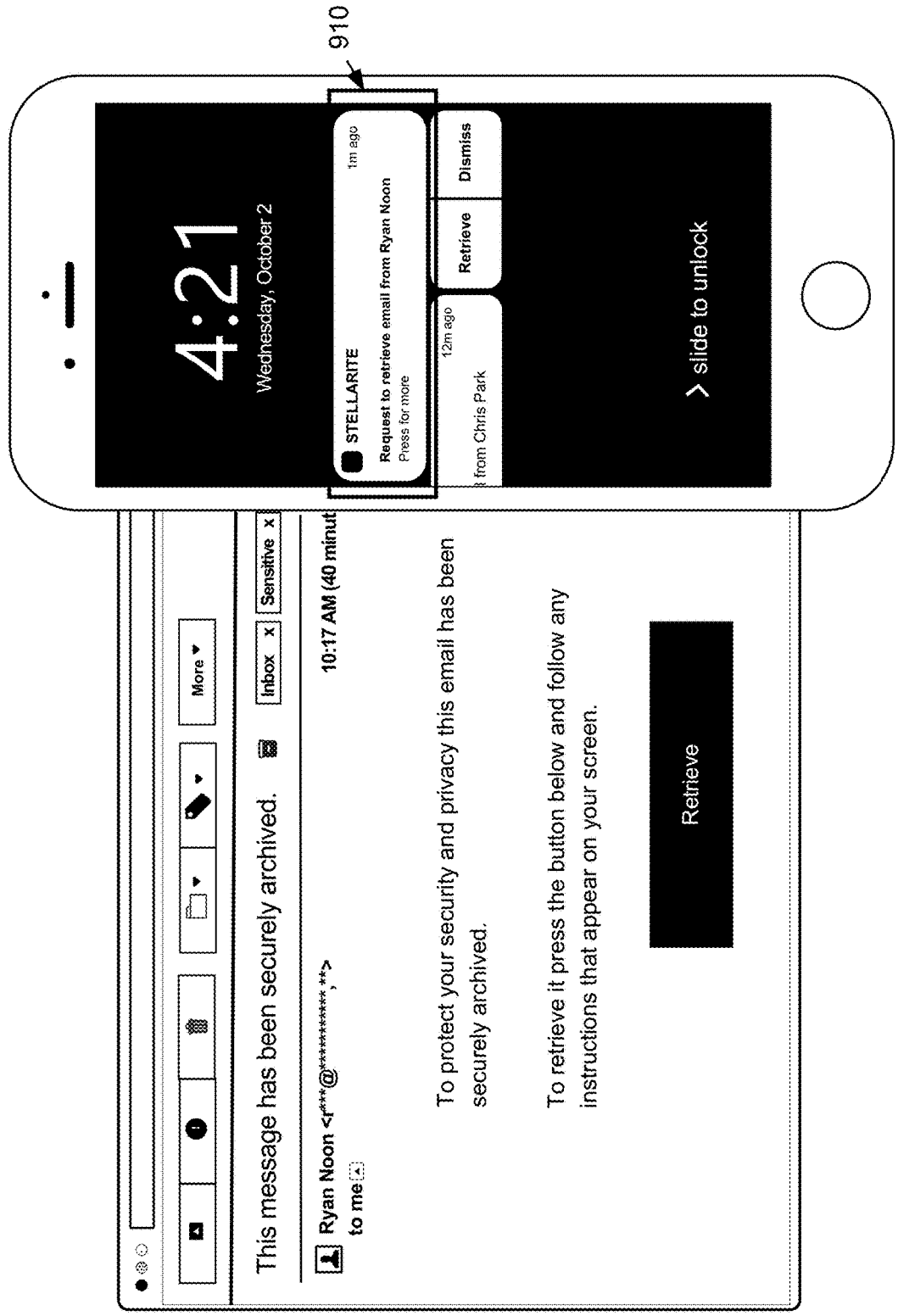
FIG. 9 depicts an example notification interface according to some embodiments.

FIG. 4 depicts a flowchart 400 of an example process of challenging a requester before retrieving sensitive data from the secure storage 214. In step 402, the secure content system 106 may receive a request from the recipient user system 102-2 that received an email with security link to access sensitive data. The email may include the security link generated by the security link generator 216. The security engine 220 may receive a request to access the sensitive data from the requester interacting with the security link in the replacement email. In some embodiments, upon receiving the request from the recipient user system 102-2, the notification engine 228 may send a notification to the sender user system 102-1, such as the notification interface 910 from FIG. 9.

In step 404, the security link generated by the security link generator 216 includes a security function which issues a challenge to a requester. The security function must be satisfied before the requester can access the sensitive data. In various embodiments, the security link is associated with executable code that produces a challenge for the recipient. In some embodiments the security link is linked to a security challenge that is remote from the recipient (e.g., the security link triggers a challenge or provides information from the secure content system 106). The challenge may be a password, a code, or any other information. In some embodiments the security link may not request any information from the requester but rather may retrieve information from the requester's digital device (e.g., VPN identifiers, MAC addresses, encryption keys, encryption key identifiers, and the like).

In step 406, the security engine 220 receives a response to the security function. For example, the security engine 220 may receive a password, code, MAC address, identifier, encryption key, and/or the like. In various embodiments, it will be appreciated the any digital device may receive the response to the security function and/or perform authentication. In some embodiments, a digital device of the user includes an application or executable code on a web browser that may perform security functions (e.g., determine time, location, MAC address, encryption keys, and the like) and/or authenticate the user or the user's digital device based on the security functions.

In step 408, the security engine 220 determines if the security function is satisfied. As discussed herein, any digital device may receive the response or result of the security functions and may authenticate the information. The security function may be chosen by the enterprise employing the service. Different security functions may be employed to access different sensitive information. For example, if the sensitive information is categorized as being highly confidential (e.g., hiring/firing decisions, salaries, strategies, core technologies, trade secrets, and the like), the enterprise may employ multiple security functions (e.g., two factor authentication and encryption keys) while other sensitive information may be categorized as being less confidential and, as a result, the enterprise may require less robust security functions or fewer security functions (e.g., a password). In various embodiments, the enterprise may configure the security functions required as well as the appropriate responses to the security challenges.

In step 410, if the security engine 220 determines that the security function is satisfied, the security engine 220 may send a request to the sensitive data provider engine 222 for the sensitive data associated with the satisfied security link. The sensitive data provider engine 222 receives the request from the security engine 220 and may enable access to the secure storage 214 for the sensitive data related to the satisfied security function.

The security engine 220 may enable access to the sensitive data in any number of ways. in various embodiments, the security engine may provide the sensitive data to the requester or provide a link whereby the requester may view the sensitive data on a remote server (e.g., the secure content system 106 or the enterprise system) without being able to download and/or copy the information. Alternately, the security engine 220 may provide the sensitive information in any form to the requester or provide instructions to any other digital device to allow the requester access to the sensitive information.

In various embodiments, the security engine 220 may not allow access to the sensitive data by others if they are not in the correct location, it is the wrong time of day, the email that was to include the sensitive data was sent too long in the past (e.g., beyond a threshold amount of time or days and therefore access has expired), a request to lock the sensitive information is received (e.g., from the email sender or an employee with sufficient data rights), there is an indication that the sender's account has been targeted, and/or the like. Similarly, in various embodiments, the security link may also become nonfunctional and/or no answer to the challenge will be deemed to satisfy the challenge if the recipient is not in the correct location, it is the wrong time of day, the email that was to include the sensitive data was sent too long in the past (e.g., beyond a threshold amount of time or days and therefore access has expired), a request to lock the sensitive information is received (e.g., from the email sender or an employee with sufficient data rights), there is an indication that the sender's account has been targeted, and/or the like.

It will be appreciated that the secure content system 106 is not limited to email or other messages, but may provide access and security to documents and other files. For example, in step 402, the secure content system 106 may receive a request from the recipient user system 102-2 that received a document or file with security link to access sensitive data. The document or file may include the security link generated by the security link generator 216. The security engine 220 may receive a request to access the sensitive data from the requester interacting with the security link in the replacement document or file. In some embodiments, upon receiving the request from the recipient user system 102-2, the notification engine 228 may send a notification to a digital device of the document or file author, moderator, or administrator.

In step 404, the security link generated by the security link generator 216 includes a security function which issues a challenge to a requester. The security function must be satisfied before the requester can access the sensitive data.

In step 406, the security engine 220 receives a response to the security function. For example, the security engine 220 may receive a password, code, MAC address, identifier, encryption key, and/or the like. In various embodiments, it will be appreciated the any digital device may receive the response to the security function and/or perform authentication. In some embodiments, a digital device of the user includes an application or executable code on a web browser that may perform security functions (e.g., determine time, location, MAC address, encryption keys, and the like) and/or authenticate the user or the user's digital device based on the security functions.

In step 408, the security engine 220 determines if the security function is satisfied. As discussed herein, any digital device may receive the response or result of the security functions and may authenticate the information. The security function may be chosen by the enterprise employing the service. Different security functions may be employed to access different sensitive information. For example, if the sensitive information is categorized as being highly confidential (e.g., hiring/firing decisions, salaries, strategies, core technologies, trade secrets, and the like), the enterprise may employ multiple security functions (e.g., two factor authentication and encryption keys) while other sensitive information may be categorized as being less confidential and, as a result, the enterprise may require less robust security functions or fewer security functions (e.g., a password). In various embodiments, the enterprise may configure the security functions required as well as the appropriate responses to the security challenges.

In step 410, if the security engine 220 determines that the security function is satisfied, the security engine 220 may send a request to the sensitive data provider engine 222 for the sensitive data associated with the satisfied security link. The sensitive data provider engine 222 receives the request from the security engine 220 and may enable access to the secure storage 214 for the sensitive data related to the satisfied security function.

The security engine 220 may enable access to the sensitive data in any number of ways. in various embodiments, the security engine may provide the sensitive data to the requester or provide a link whereby the requester may view the sensitive data on a remote server (e.g., the secure content system 106 or the enterprise system) without being able to download and/or copy the information. Alternately, the security engine 220 may provide the sensitive information in any form to the requester or provide instructions to any other digital device to allow the requester access to the sensitive information.

In various embodiments, the security engine 220 may not allow access to the sensitive data by others if they are not in the correct location, it is the wrong time of day, the email that was to include the sensitive data was sent too long in the past (e.g., beyond a threshold amount of time or days and therefore access has expired), a request to lock the sensitive information is received (e.g., from the email sender or an employee with sufficient data rights), there is an indication that the sender's account has been targeted, and/or the like. Similarly, in various embodiments, the security link may also become nonfunctional and/or no answer to the challenge will be deemed to satisfy the challenge if the recipient is not in the correct location, it is the wrong time of day, the email that was to include the sensitive data was sent too long in the past (e.g., beyond a threshold amount of time or days and therefore access has expired), a request to lock the sensitive information is received (e.g., from the email sender or an employee with sufficient data rights), there is an indication that the sender's account has been targeted, and/or the like.

Figure 5:
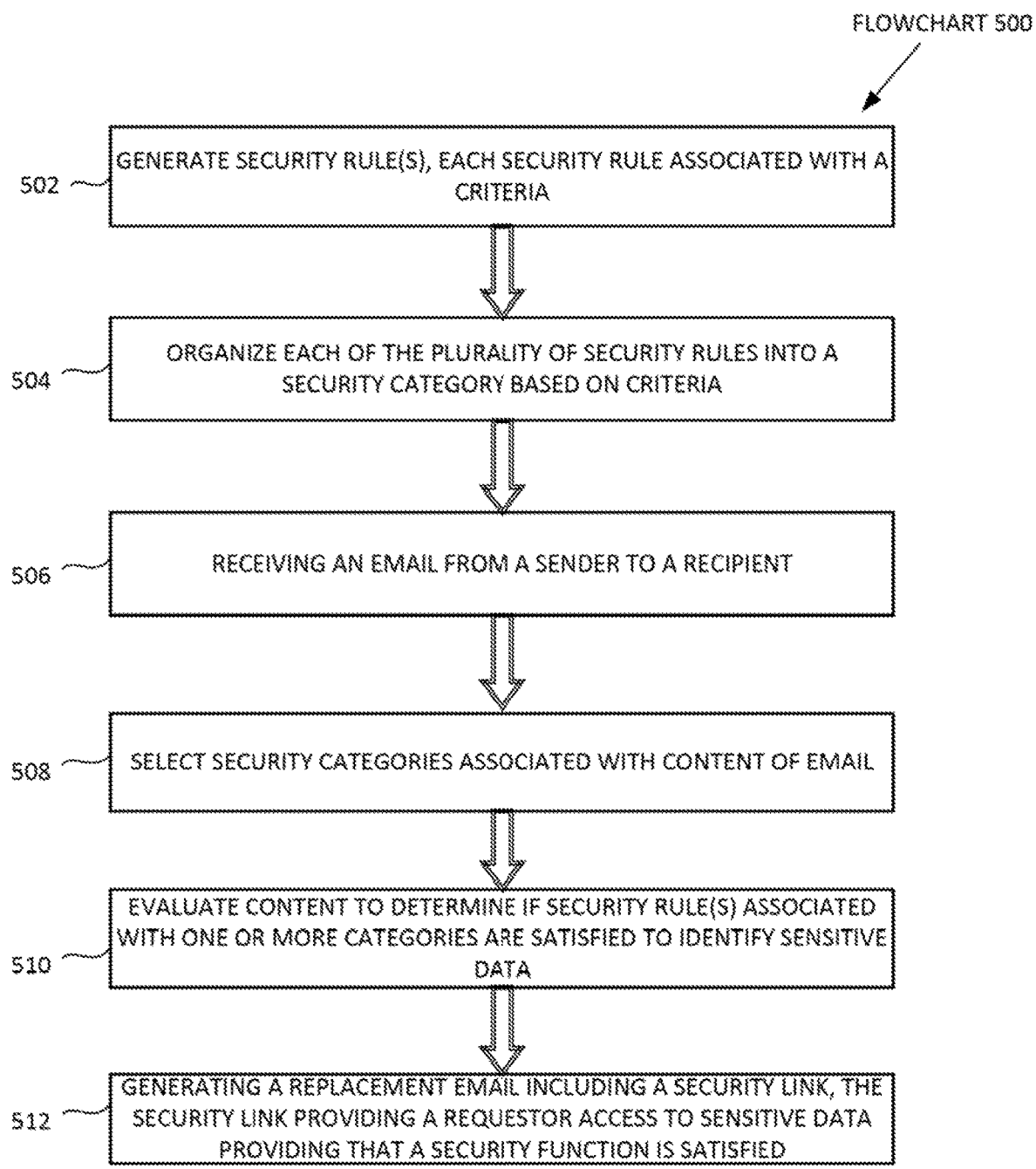
FIG. 5 depicts a flowchart of the process of securing contents according to various embodiments.

FIG. 5 depicts a flowchart 500 of the process of securing contents in some embodiments. In step 502, the security policy engine 208 is configured to generate security rules. Each security rule is associated with at least one criteria. In some embodiments, security rules may be associated with the sender or the recipient, for example, the entire contents of an email sent by a corporate attorney of an enterprise may be automatically marked as sensitive. In various embodiments, security rules may be associated with the location or time that a requester is trying to access the sensitive data by interacting with the security link. In one example security rules may be associated with a particular enterprise.

In step 504, the security policy engine 208 organizes a plurality rules into a security category according to the criterion associated with each of the plurality of security rules. In some embodiments, a security rule may be organized into one or more security categories. The plurality of security rules may be stored in the security rule datastore 210. Security categories may organize security rules according to industry (e.g., such as healthcare, military, banking, or the like), group, organization, department, function, and/or organizational culture (e.g., such as temporary employees, external contractors, interns, executive, or the like).

In step 506, the communication engine 202 facilitates a request from sender user system 102-1 to send an email from the sender user system 102-1. The secure content system 106 may monitor the sender user system 102-1's email communications on the enterprise email system 124. In some embodiments, the content scanning engine 206 of the secure content system 106 may be configured to evaluate the email from the enterprise email system 124.

In step 508, the security policy engine 208 may be configured to select one or more security categories to apply to the content scanned by the content scanning engine 206 based on the content that was scanned, the email sender, the email receiver, location, time of day, metadata associated with the email, attachments, scanned content of attachments (which may also contain sensitive information), and/or any other information.

In step 510, subsequent to step 508 in which based on one or more security category has been selected the security rules associated with the selected security category stored in the security rule datastore 210 may be used by the sensitive data engine 212 to evaluate the contents of the email to identify sensitive data. The content may be contained within an email (and/or attachment of the email) and may include textual components. In some embodiments, the content scanning engine 206 may perform textual recognition processes on the contents of the email. In some embodiments, the content includes digital images, digital video and the content scanning engine 206 may perform image recognition or pattern recognition processes.

In step 512, the security link generator 216 may be configured to generate a security link which enables execution of a local function (e.g., local to the entity that executed the link such as the recipient's computer), enables execution of any number of security functions on any number of digital devices to challenge the requester (i.e., the requester being the user or digital device that executed or interacted with the security link). The security link includes at least one security function that is satisfied before a requester can access the sensitive data. In some embodiments, the requester is the recipient of the email, or a representative of the recipient of the email. The security link may be included in the replacement email generated by replacement engine 218.

In some embodiments, the replacement email does not include the sensitive data identified by the sensitive data engine 212. The security function issues a challenge to the requester, the challenge presented to the user may require the requester to enter a password or answer a security question selected by the sender of the email, or a representative of the sender of the email. In some embodiments, the sender of the email determines the type of security function presented to subsequent recipients of the email. In various embodiments, the enterprise system 120 determines the type of security function presented to subsequent recipients of the email according to a level of sensitivity of the email.

In the above example, contents secured by the secure content system 106 is an email. In various embodiments, the contents may include digital images, digital videos.

As discussed herein, systems and methods described may be utilized in the context of documents and/or files. For example, in step 506, the communication engine 202 facilitates a request from a user or user digital device to access a document or file. The secure content system 106 may monitor the sender user system 102-1's request for the document or file. In some embodiments, the secure content system 106 may monitor or intercept requests for documents or files from a file server or document server (or any digital devices). In some embodiments, the content scanning engine 206 of the secure content system 106 may be configured to evaluate the requested document(s) or file(s) from the enterprise email system 124.

In step 508, the security policy engine 208 may be configured to select one or more security categories to apply to the content scanned by the content scanning engine 206 based on the content that was scanned, the document(s) and/or file(s) requester, the DMS/file server storing the documents or files, categories or metadata associated with the document(s) and/or file(s), location of the document(s) and/or file(s), time of day, and/or any other information.

In step 510, subsequent to step 508 in which based on one or more security category has been selected the security rules associated with the selected security category stored in the security rule datastore 210 may be used by the sensitive data engine 212 to evaluate the contents of the document(s) and/or file(s) to identify sensitive data. In some embodiments, the content scanning engine 206 may perform textual recognition processes on the contents of the document(s) and/or file(s). In some embodiments, the content includes digital images, digital video and the content scanning engine 206 may perform image recognition or pattern recognition processes.

In step 512, the security link generator 216 may be configured to generate a security link which enables execution of a local function (e.g., local to the entity that executed the link such as the recipient's computer), enables execution of any number of security functions on any number of digital devices to challenge the requester (i.e., the requester being the user or digital device that executed or interacted with the security link). The security link includes at least one security function that is satisfied before a requester can access the sensitive data. In some embodiments, the requester is the requester of the document(s) and/or file(s), or a creator/administrator/editor/modifier of one or more of the document(s) and/or file(s). The security link may be included in replacement document(s) and/or file(s) generated by replacement engine 218.

In some embodiments, the replacement document(s) and/or file(s) do not include the sensitive data identified by the sensitive data engine 212. The security function issues a challenge to the requester, the challenge presented to the user may require the requester to enter a password or answer a security question selected by an administrator or user associated with the document(s) and/or file(s). In some embodiments, the administrator or user associated with the document(s) and/or file(s) determines the type of security function presented to those that wish to access one or more of the document(s) and/or file(s). In various embodiments, the enterprise system 120 determines the type of security function presented to subsequent requesters of the document(s) and/or file(s) according to a level of sensitivity of the document(s) and/or file(s).

Figure 6:
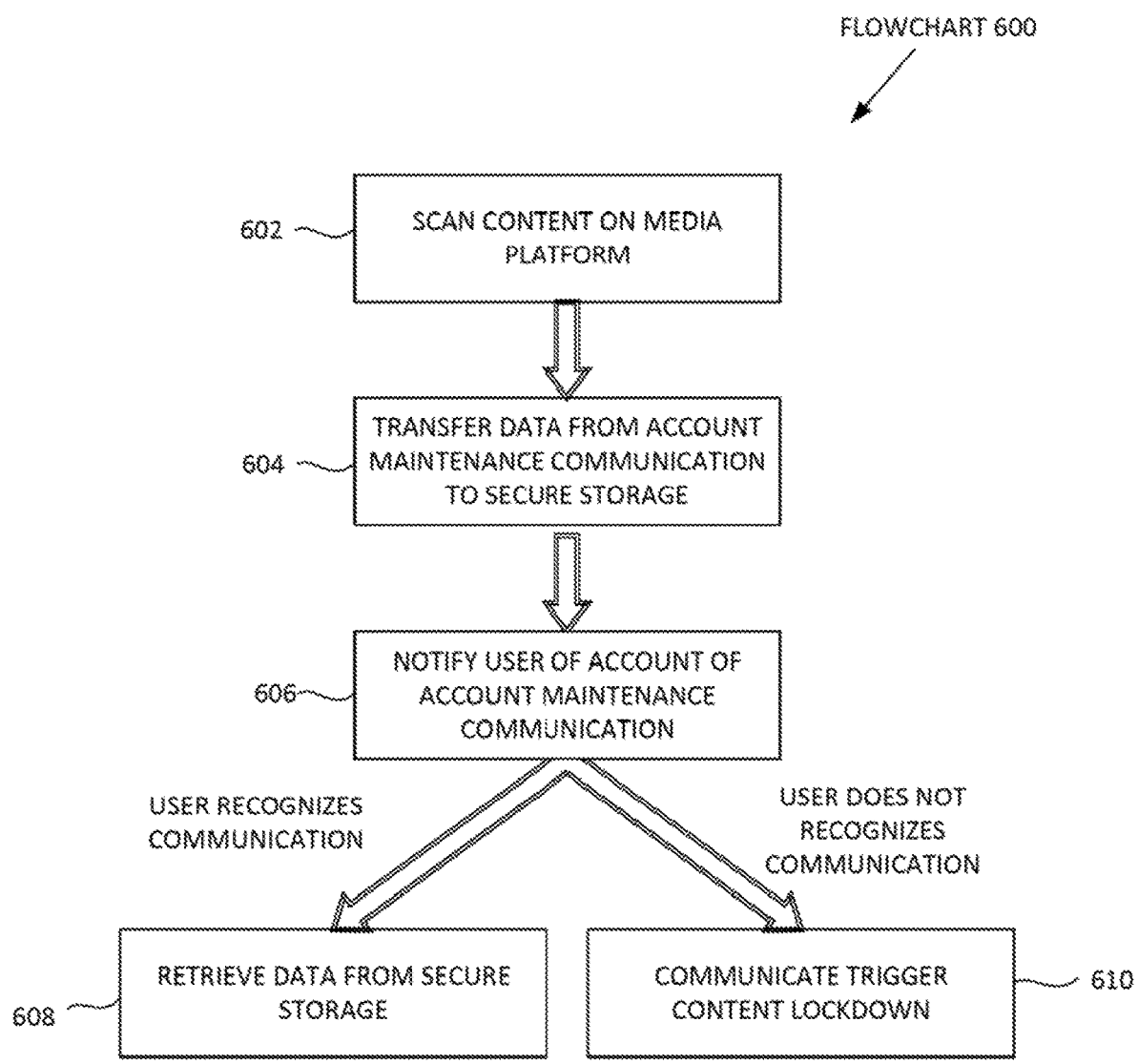
FIG. 6 depicts a flowchart of the process of account maintenance authentication according to some embodiments.

FIG. 6 depicts a flowchart 600 of the process of account maintenance authentication according to some embodiments. In step 602, the content scanning engine 206 of the secure content system 106 scans the content on a media platform such as an email account of the recipient user system 102-2 in the third-party email server 110 of FIG. 1. The secure content system 106 may be configured to monitor the email communications of the recipient user system 102-2 on the third-party email system 110 by evaluating the content based on security rules. The sensitive data engine 212 may evaluate the contents of the email account to identify sensitive data within the content. The sensitive data engine 212 may evaluate the content using security rules which may redact any amount of contents (e.g., including entire contents) of an email if it matches a template of an account maintenance communication, or contain keywords associated with the account maintenance communication. The account maintenance communication may include password reset request email or an account change notification email.

In step 604, when the sensitive data engine 212 identifies sensitive data, in the form of the account maintenance communication and transfers data from the account maintenance communication to the secure storage 214. In some embodiments, the data transferred from the account maintenance communication to secure storage 214 comprise the URL of the internet address to reset a password, information such as the user name, address of the recipient user system 102-2.

Figure 10:
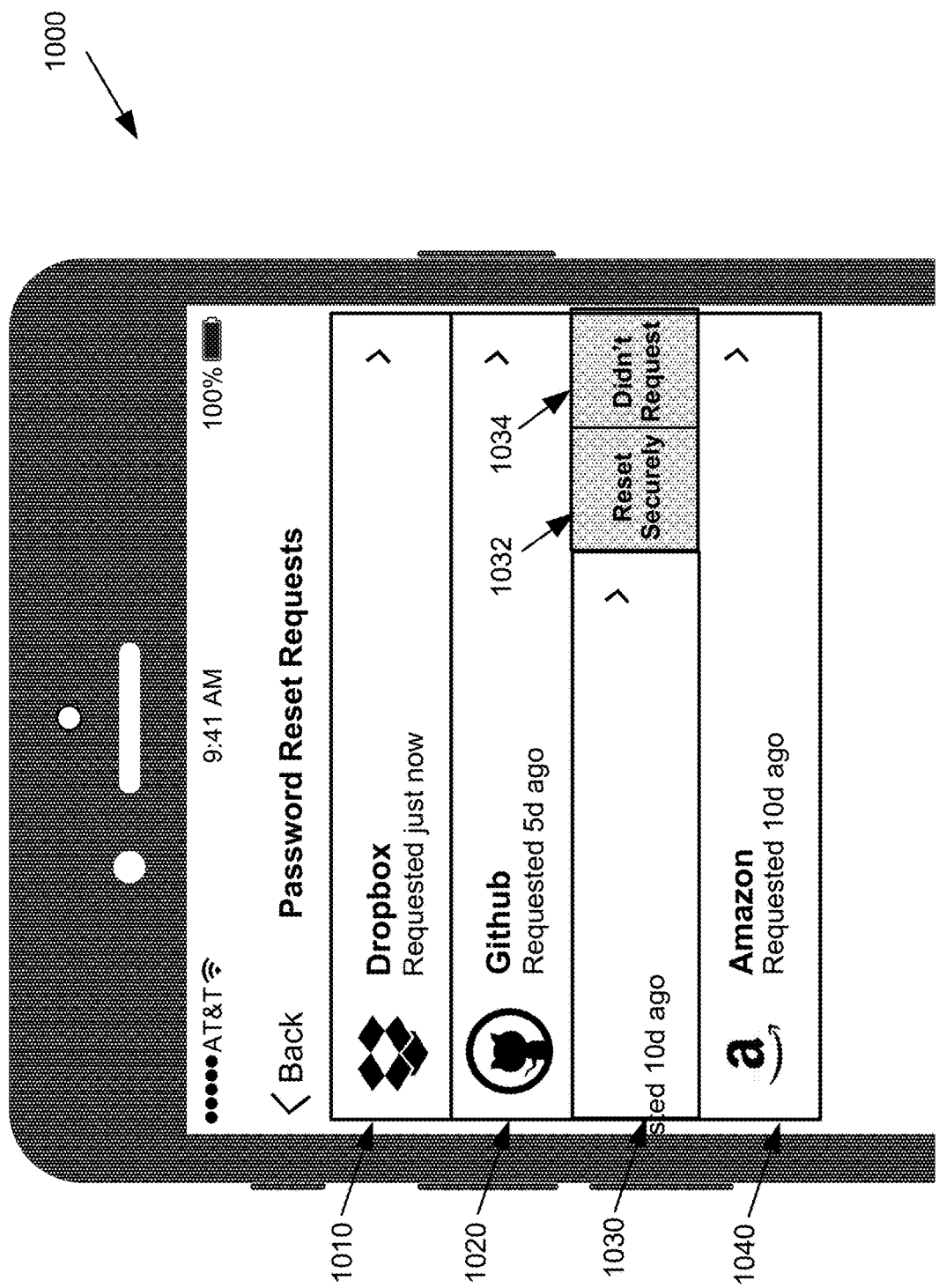
FIG. 10 depicts a communication interface according to some embodiments.

In step 606, the notification engine 228 notifies the user of recipient user system 102-2 of changes in the user's contents or accounts or, alternately, requests for such changes. In some embodiments, the notification engine sends SMS or MMS messages to the user to determine if the user initiated an account maintenance communication. In various embodiments, the notification engine inform a sender of an email with sensitive data that one or more recipients of the email have successfully (or unsuccessfully) accessed the sensitive data. A communication interface 1000 from FIG. 10 shows an example notification of a plurality of password reset requests. Notifications 1010, 1020, 1030, and 1040, which may be display on the output device 1514 from FIG. 15, show the notification from four different web applications or websites of account maintenance communications. In some embodiments, the notification engine 228 informs the user of changes in the user's contents or accounts by sending a notification email to an alternate email address of the user, such as example notification email 1200 from FIG. 12.

In step 608, if the user of recipient user system 102-2 recognizes the account maintenance communication from the notification engine 228. The user may send an authenticate message to the secure content system 106 recognizing that the account maintenance communication is known to the user. The secure content system 106 receives the authenticate message and as a result, controller engine 204 may send a request to the secure storage 214 for the data transferred from the account maintenance communication to the secure storage 214. For example, the user may send an authentication message by interacting with the "Reset Securely" electronic button 1032 from FIG. 10.

In step 610, if the user of recipient user system 102-2 does not recognize the account maintenance communication from the notification engine 228. The user may send a decline message to the secure content system 106, informing the secure content system 106 of a possible breach of the user's email account. The secure content system 106 may trigger a content lockdown of the user's email account. In some embodiments, the secure content system 106 may log an instance of the recipient user system 102-2's rejection of the account maintenance communication and the secure content system 106 does not trigger an account lockdown or content lockdown associated with the user's email account until the number of rejections from the user and/or other users that received similar messages exceeds a rejection threshold value. The content lockdown may comprise suspending the sending outgoing emails and the reception of incoming emails. The user of recipient user system 102-2 may be notified of the lockdown of the user's email account by the notification engine 228. For example, the user may send a decline message by interacting with the "Didn't Request" electronic button 1034 from FIG. 10. In some embodiments, if the user of recipient user system 102-2 does not recognize the account maintenance communication from the notification engine 228, the notification engine 228 may send an alert to the recipient user system 102-2 using an alternate method of communication such as SMS, MMS or an alternate email address of the user of recipient user system 102-2.

Figure 7:
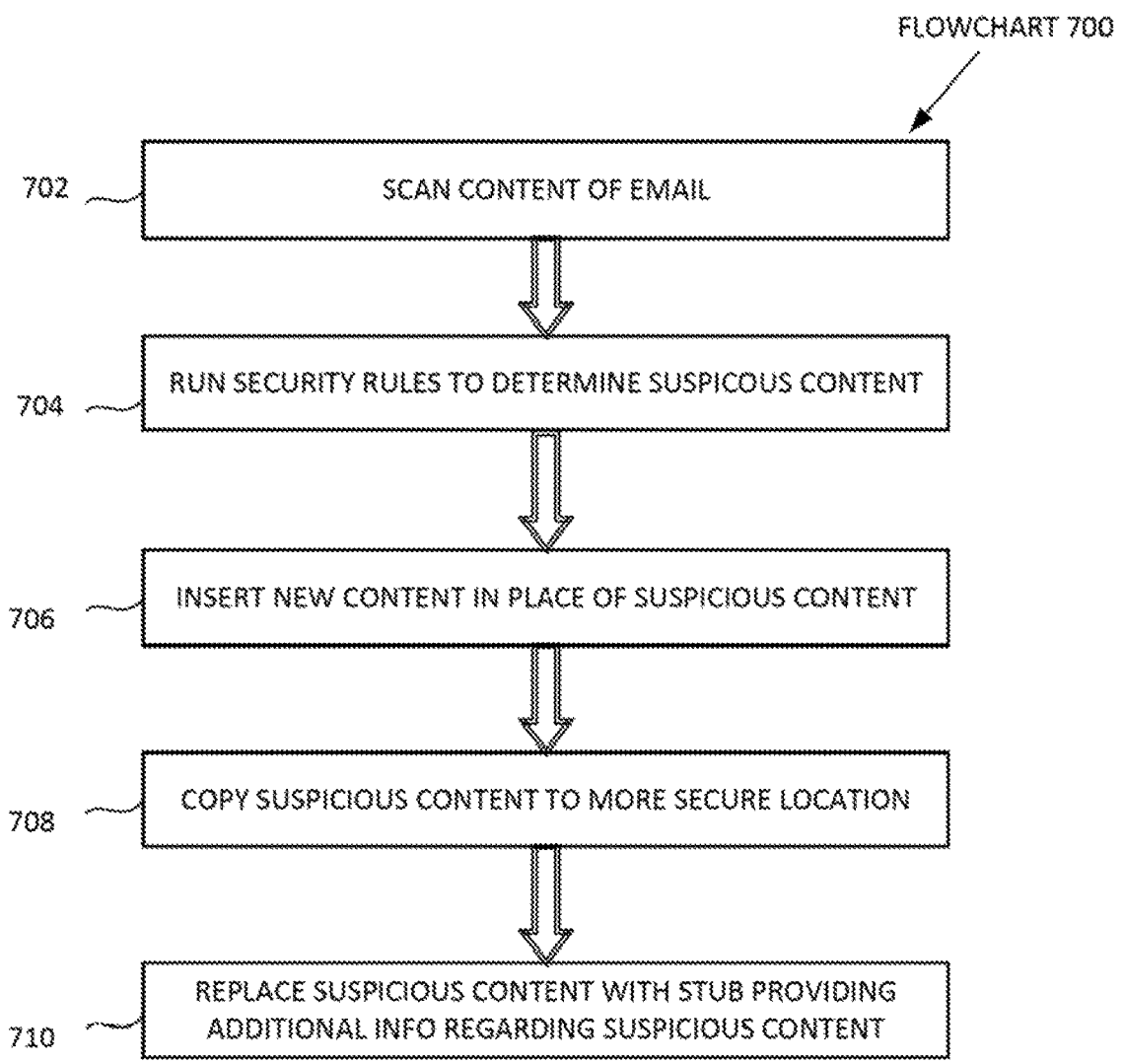
FIG. 7 depicts a flowchart of the process of suspicious content mitigation according to some embodiments.

FIG. 7 depicts a flowchart 700 of the process of suspicious content mitigation according to some embodiments. In step 702, the content scanning engine 206 of the secure content system 106 may scan or evaluate the email from the enterprise email system 124 or the third-party email server 110.

In step 704, the sensitive data engine 212 may evaluate the contents of the email (and/or evaluate the contents of any number of attachments of the email) based on security rules to identify suspicious content. The suspicious content may be a phishing email and security rules may identify keywords "account," "secur," "auth," "update," and the like (including, in some embodiments, synonyms and words with similar meaning). The security rules which may be used to identify suspicious content may include verifying the authenticity of a sender of an email. For example, an email displaying the sender of an email as "Apple Purchase Receipt," however, further investigation yields that the email address associated with "Apple Purchase Receipt" has no affiliations with Apple. In some embodiments, one of a first plurality of recipients receiving the email from the originating sending may identify suspicious content in the email designate the email suspicious.

Figure 11:
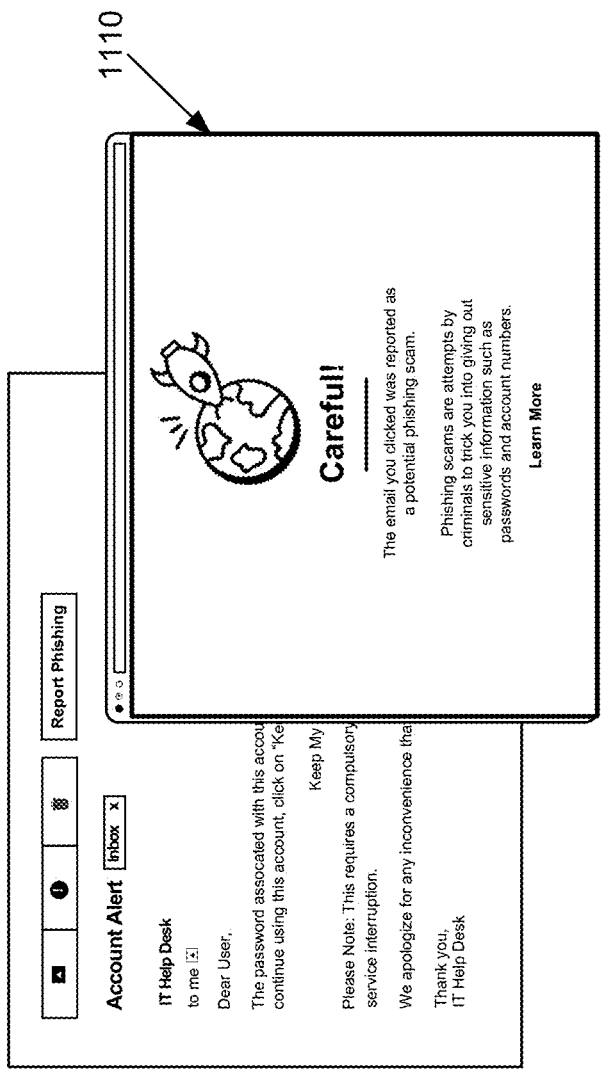
FIG. 11 depicts an example phishing interface according to some embodiments.

In step 706, the security link generator 216 may generate a security link which replaces the identified suspicious content (the link may be within the email and/or within any number of attachments). The generated security link may point to a location (e.g., memory address) within the secure storage 214 where the identified suspicious content is stored. Alternately, the security link may trigger security functions to enable access to the suspicious content. The security link generator 216 may replace some or all of the contents of email (and/or attachments) with an example interface 1110 from FIG. 11. The example interface 1110 may comprise a message informing the sender and recipients of the email of the potential phishing scam.

In step 708, the identified suspicious content may be stored in the secure storage 214, third-party cloud storage, enterprise storage, or any other device(s). By storing the identified suspicious content in the secure storage 214 and/or elsewhere, recipients of the email will not be given the opportunity to interact with the phishing email, reducing the chances of spreading the phishing email.

In step 710, the replacement engine 218 generates a replacement email which includes the security link generated by the security link generator 216 (e.g., in the email and/or attachments). The generated security link may include the example interface 1110 from FIG. 11.

In some embodiments, once an email identified as containing suspicious content, by the secure content system 106 or by the one of the first plurality of recipient, the email containing the suspicious content is replaced by the replacement email in the electronic mailboxes of the remaining first plurality of recipients, and any subsequent recipient of the email subscribed to the secure content system 106. The secure content system 106 may log the instance of the suspicious content in a suspicious report. The suspicious report may be used by other users or enterprises of system 100 to determine future suspicious content.

Figure 13:
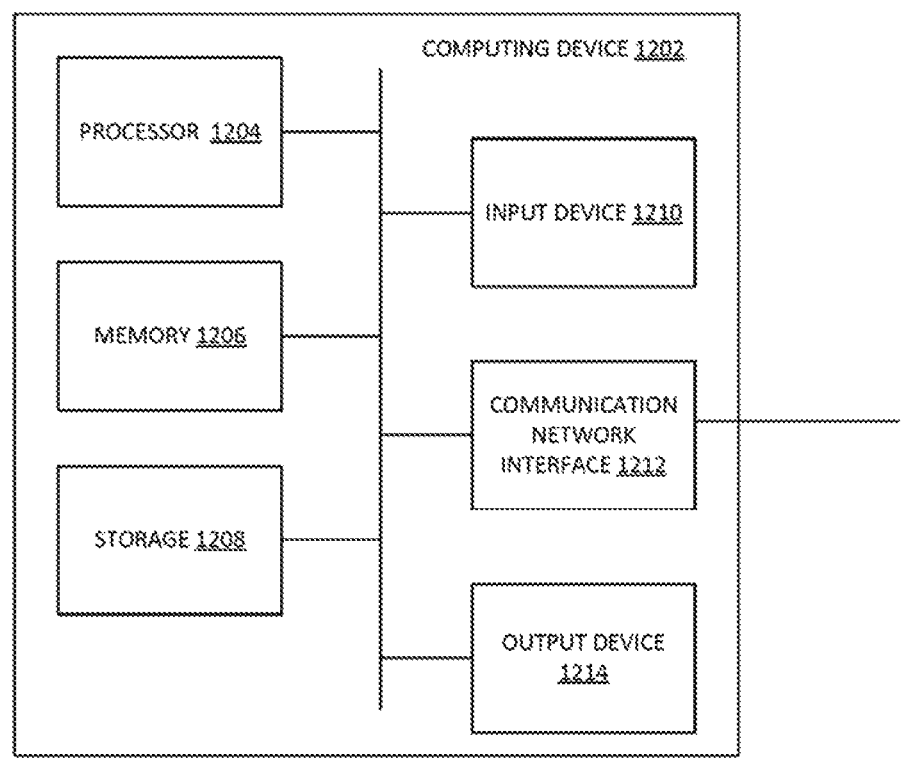
FIG. 13 depicts a block diagram of an example computing device according to some embodiments.

FIG. 13 depicts a block diagram of an example computing device 1302 according to some embodiments. Any user system 102, content delivery system 106 and domain system 108 may comprise an instance of computing device 1302. Computing device 1302 comprises a processor 1304, a memory 1306, a storage 1308, an input device 1310, a communication network interface 1312 and an output device 1314. Processor 1304 is configured to execute executable instructions (e.g., programs). In some embodiments, the processor 1304 comprises circuitry or any processor capable of processing the executable instructions.

Memory 1306 stores data. Some examples of memory 1306 include storage devices, such as RAM, ROMA, RAM cache, virtual memory, etc. In various embodiments, working data is stored within memory 1306. The data within memory 1306 may be cleared or ultimately transferred to storage 1308.

Storage 1308 includes any storage configured to retrieve and store data. Some examples of storage 1308 includes flash drives, hard drives, optical drives, and/or magnetic tape. Each of memory system 1306 and storage system 1308 comprises a computer-readable medium, which stores instructions or programs executable by processor 1304.

Input device 1310 is any device that inputs data (e.g., mouse, keyboard, stylus). Output device 1314 outputs data (e.g., speaker, display, virtual reality headset). It will be appreciated that storage 1308, input device 1310 and output device 1314 may be optional. For example, routers/switchers may comprise processor 1304 and memory 1306 as well as a device to receive and output data (e.g., communication network interface 1312 and/or output device 1314).

Communication network interface 1312 may be coupled to a network (e.g. communication network 104) via communication network interface 1312. Communication network interface 1312 may support communication over an Ethernet connection, a serial connection, a parallel connection, and/or an ATA connection. Communication network interface 1312 may also support wireless communication (e.g., 802.11 a/b/g/n, WiMax, LTE, WiFi). It will be apparent that communication network interface 1312 may support many wired and wireless standards.

The invention claimed is:

1. A non-transitory computer-readable medium comprising memory with instructions encoded thereon, the instructions, when executed by one or more processors, caused to perform operations, the instructions comprising instructions to:

perform, by a secure content system, a scan of a plurality of electronic messages of an electronic repository of a user for sensitive data;

for each electronic message of a subset of the plurality of electronic messages found to have sensitive data as a result of the scan, generate, by the secure content system, a replacement electronic message including a security link and not including at least the sensitive data, wherein the security link, when selected by a requester, leads to a security function being provided to the requester that, if satisfied, unlocks access by the requester to the sensitive data;

replace, in the electronic repository, each electronic message of the subset with its respective replacement electronic message while maintaining original copies of the subset in a secure location separate from the electronic repository of the user;

receive, based on the user interacting with the security link within a given replacement electronic message by way of a client device of the user, a request to access given sensitive data within an original copy of the given replacement electronic message;

determine that the security function is satisfied; and responsive to determining that the security function is satisfied, send, by the secure content system, the original copy of the given replacement electronic message from the secure location to the electronic repository of the user, thereby enabling the user to access the original copy of the given replacement electronic message by a retrieval operation performed by the client device.

2. The non-transitory computer-readable medium of claim 1, wherein contents of the original copy of the given replacement electronic message include textual components, and wherein the instructions to perform the scan comprise instructions to perform a text matching operation on the textual components.

3. The non-transitory computer-readable medium of claim 1, the instructions further comprising instructions to, after sending the original copy of the given replacement electronic message, delete the sensitive data from the secure location.

4. The non-transitory computer-readable medium of claim 1, wherein the instructions to perform the scan further comprise instructions to:

select one or more security categories based on contents of a given electronic message of the plurality of electronic messages; and scan the contents of the given electronic message to determine whether one or more of a plurality of security rules associated with the selected one or more security categories are satisfied.

5. The non-transitory computer-readable medium of claim 1, wherein the sensitive data is searchable by the user regardless of whether a replacement electronic message or a corresponding copy of an original electronic message is within the electronic repository of the user.

6. The non-transitory computer-readable medium of claim 1, wherein the scan yields a determination of given sensitive data for a given original electronic message based on a sender having marked at least a portion of the given original electronic message sensitive.

7. The non-transitory computer-readable medium of claim 1, the instructions further comprising instructions to remove, from the electronic repository of the user, the original copy of the given replacement electronic message responsive to determining that a threshold amount of time has elapsed from a time at which the original copy of the given replacement electronic message was sent to the electronic repository of the user.

8. A method comprising:

performing, by a secure content system, a scan of a plurality of electronic messages of an electronic repository of a user for sensitive data;

for each electronic message of a subset of the plurality of electronic messages found to have sensitive data as a result of the scan, generating, by the secure content system, a replacement electronic message including a security link and not including at least the sensitive data, wherein the security link, when selected by a requester, leads to a security function being provided to the requester that, if satisfied, unlocks access by the requester to the sensitive data;

replacing, in the electronic repository, each electronic message of the subset with its respective replacement electronic message while maintaining original copies of the subset in a secure location separate from the electronic repository of the user;

receiving, based on the user interacting with the security link within a given replacement electronic message by way of a client device of the user, a request to access given sensitive data within an original copy of the given replacement electronic message;

determining that the security function is satisfied; and responsive to determining that the security function is satisfied, sending, by the secure content system, the original copy of the given replacement electronic message from the secure location to the electronic repository of the user, thereby enabling the user to access the original copy of the given replacement electronic message by a retrieval operation performed by the client device.

9. The method of claim 8, wherein contents of the original copy of the given replacement electronic message include textual components, and wherein performing the scan comprises performing a text matching operation on the textual components.

10. The method of claim 8, further comprising, after sending the original copy of the given replacement electronic message, deleting the sensitive data from the secure location.

11. The method of claim 8, wherein performing the scan further comprises:

selecting one or more security categories based on contents of a given electronic message of the plurality of electronic messages; and scanning the contents of the given electronic message to determine whether one or more of a plurality of security rules associated with the selected one or more security categories are satisfied.

12. The method of claim 8, wherein the sensitive data is searchable by the user regardless of whether a replacement electronic message or a corresponding copy of an original electronic message is within the electronic repository of the user.

13. The method of claim 8, wherein the scan yields a determination of given sensitive data for a given original electronic message based on a sender having marked at least a portion of the given original electronic message sensitive.

14. The method of claim 8, further comprising removing, from the electronic repository of the user, the original copy of the given replacement electronic message responsive to determining that a threshold amount of time has elapsed from a time at which the original copy of the given replacement electronic message was sent to the electronic repository of the user.

15. A secure content system comprising:

memory with instructions encoded thereon; and one or more processors that, when executing the instructions, cause the secure content system to perform operations comprising:

performing a scan of a plurality of electronic messages of an electronic repository of a user for sensitive data;

for each electronic message of a subset of the plurality of electronic messages found to have sensitive data as a result of the scan, generating a replacement electronic message including a security link and not including at least the sensitive data, wherein the security link, when selected by a requester, leads to a security function being provided to the requester that, if satisfied, unlocks access by the requester to the sensitive data;

replacing, in the electronic repository, each electronic message of the subset with its respective replacement electronic message while maintaining original copies of the subset in a secure location separate from the electronic repository of the user;

receiving, based on the user interacting with the security link within a given replacement electronic message by way of a client device of the user, a request to access given sensitive data within an original copy of the given replacement electronic message;

determining that the security function is satisfied; and responsive to determining that the security function is satisfied, sending, by the secure content system, the original copy of the given replacement electronic message from the secure location to the electronic repository of the user, thereby enabling the user to access the original copy of the given replacement electronic message by a retrieval operation performed by the client device.

16. The secure content system of claim 15, wherein contents of the original copy of the given replacement electronic message include textual components, and wherein performing the scan comprises performing a text matching operation on the textual components.

17. The secure content system of claim 15, the operations further comprising, after sending the original copy of the given replacement electronic message, deleting the sensitive data from the secure location.

18. The secure content system of claim 15, wherein performing the scan further comprises:
   selecting one or more security categories based on contents of a given electronic message of the plurality of electronic messages; and
   scanning the contents of the given electronic message to determine whether one or more of a plurality of security rules associated with the selected one or more security categories are satisfied.

19. The secure content system of claim 15, wherein the sensitive data is searchable by the user regardless of whether a replacement electronic message or a corresponding copy of an original electronic message is within the electronic repository of the user.

20. The secure content system of claim 15, wherein the scan yields a determination of given sensitive data for a given original electronic message based on a sender having marked at least a portion of the given original electronic message sensitive.

\* \* \* \* \*